US012321939B2

(12) United States Patent
Basu et al.

(10) Patent No.: US 12,321,939 B2
(45) Date of Patent: Jun. 3, 2025

(54) PLATFORM-AGNOSTIC UNIVERSAL TRANSACTION PROFILES

(71) Applicant: PAYPAL, INC., San Jose, CA (US)

(72) Inventors: Rohit Basu, San Jose, CA (US); Abhishek Kakani, Danville, CA (US); Meggan Marie Dunne, Austin, TX (US); Andrew Throener, Omaha, NE (US); Trini George, Milpitas, CA (US); Michael LaRosa, Mission Viejo, CA (US)

(73) Assignee: PAYPAL, INC., San Jose, CA (US)

( * ) Notice: Subject to any disclaimer, the term of this patent is extended or adjusted under 35 U.S.C. 154(b) by 112 days.

(21) Appl. No.: 18/452,389

(22) Filed: Aug. 18, 2023

(65) Prior Publication Data

US 2025/0061456 A1 Feb. 20, 2025

(51) Int. Cl.
   *G06Q 20/40* (2012.01)
(52) U.S. Cl.
   CPC .............................. *G06Q 20/4014* (2013.01)
(58) Field of Classification Search
   CPC ................................................ G06Q 20/4014
   See application file for complete search history.

(56) References Cited

U.S. PATENT DOCUMENTS

| 11,032,423 B2 * | 6/2021 | Nitidharmatut .... G06Q 30/0269 |
| 11,593,773 B1 | 2/2023 | Yip et al. |
| 2012/0323734 A1 | 12/2012 | Dominguez et al. |
| 2017/0364879 A1 | 12/2017 | Malhotra et al. |
| 2021/0326964 A1 | 10/2021 | Isaacson et al. |
| 2023/0394473 A1 * | 12/2023 | Aslaksen ............. G06Q 20/401 |
| 2024/0020697 A1 * | 1/2024 | Albero ..................... G06F 21/31 |

FOREIGN PATENT DOCUMENTS

| CA | 2312449 A1 * | 2/2001 | ........... G06F 16/258 |
| CA | 3009672 A1 * | 8/2017 | ............. G06Q 20/12 |

OTHER PUBLICATIONS

Narayanan et al.: Anpvel system architecture for secure authentication and data sharing in cloud enabled Big Data Environment, 2020, Journal of King Saud University—Computer and Information Science, 34, pp. 3121-3135 (Year: 2020).*

(Continued)

*Primary Examiner* — Bijendra K Shrestha
(74) *Attorney, Agent, or Firm* — Haynes and Boone, LLP

(57) ABSTRACT

Methods and systems are presented for providing a framework for facilitating electronic transactions by dynamically managing and sharing user data with multiple online platforms. As a user accesses one or more online platforms, a connect system that is integrated with the online platforms interacts with the user and obtain, from the user, user data that is usable for completing transactions between the user and the online platforms. The user data is stored in a user profile associated with the user and linked to an identifier of the user. When the user subsequently accesses an online platform, the connect system authenticates the user based on an identifier associated with the user, and share at least a portion of the user data stored in the user profile with the online platform to facilitate a transaction between the user and the online platform.

20 Claims, 10 Drawing Sheets

(56) References Cited

OTHER PUBLICATIONS

Davis et al.: The S2CT Dynamic, Secure, Peer-to-Peer, Private Data Sharing Network with Blockchain, 2021, Smart Chain Technologies Ltd., pp. 1-9 (Year: 2021).*

Salesforce: Platform Multitenant Architecture, Aug. 2022, Salesforce Archtect, pp. 1-26 (Year: 2022).*

PCT/US24/40231, International Search Report and Written Opinion, Nov. 18, 2024, 13 pages.

* cited by examiner

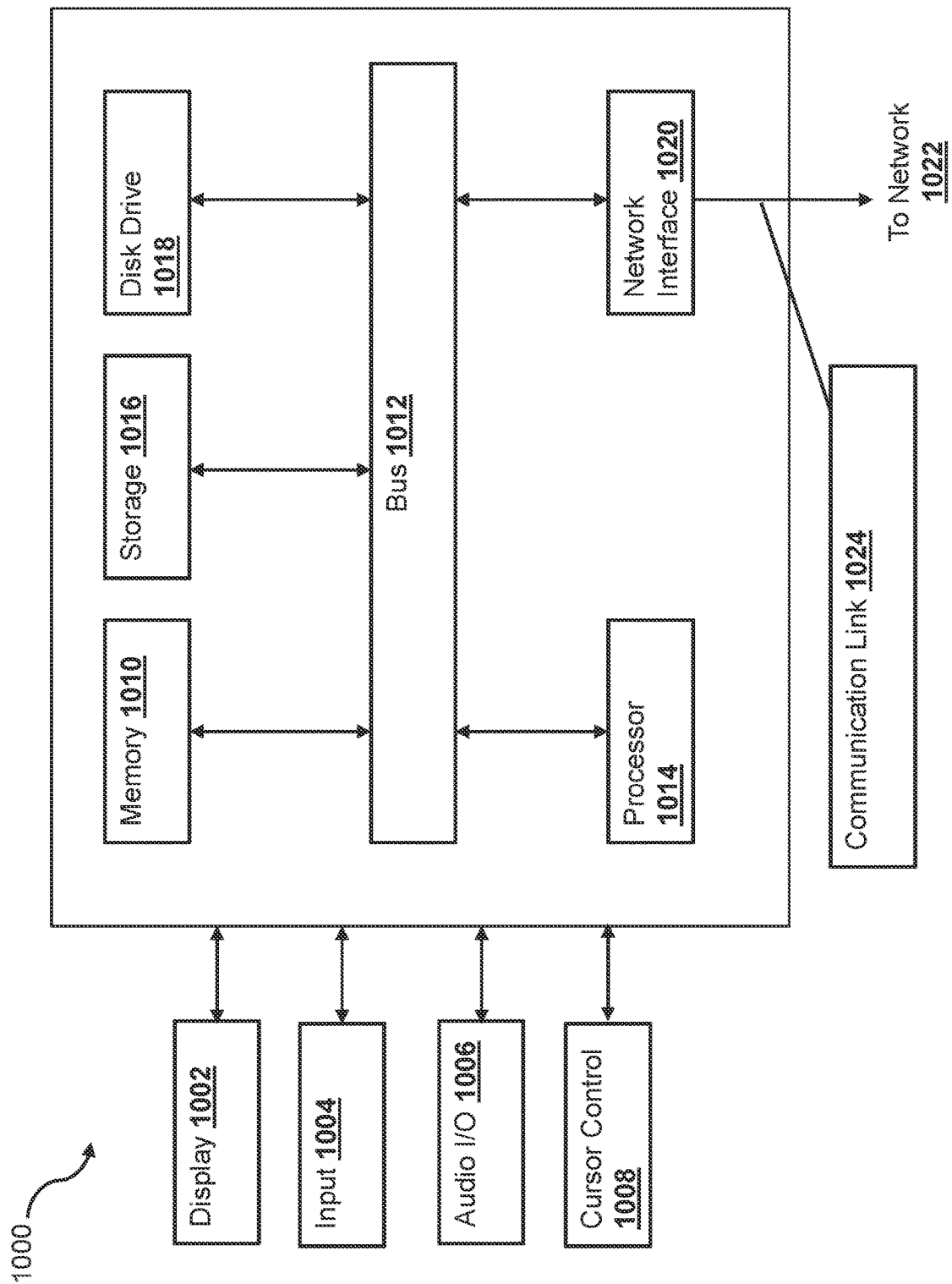

PLATFORM-AGNOSTIC UNIVERSAL TRANSACTION PROFILES

BACKGROUND

The present specification generally relates to management of user identities and data, and more specifically, to dynamically sharing user data with different platforms based on user authentication according to various embodiments of the disclosure.

RELATED ART

Many transaction services (e.g., purchasing of items, bill payments, registration services, etc.) are now available online, allowing users to conduct these transactions anywhere via a computing device. However, due to the different transaction services being offered by different separate entities (e.g., different merchants, different utility companies, different government agencies, etc.), users are required to conduct the transactions via different online platforms or portals (e.g., different websites, etc.). As a result, users may be required to provide the same information (e.g., user data, funding instrument data, shipping data, etc.) to the online platforms each time the users desire to conduct an online transaction. Providing information via a computing device can be cumbersome, especially when the data input mechanism is far from ideal (e.g., a small touch screen from a mobile device such as a mobile phone or a smart watch, etc.). Furthermore, having to repetitively provide potentially sensitive information (e.g., funding instrument information, personal identifiable information, etc.) via the computer device and over a network can be prone to data security problems, such as identity theft, unauthorized usages of funding instruments, etc.

In the past, some of the online platforms have attempted to mitigate such problems by storing user data on their respective servers (e.g., data vaults). For example, a user can register an account with each of the online platforms, and may access the user data stored on the respective servers after successfully performing an authentication process (e.g., providing a correct user name and password pair, etc.). However, such an arrangement is also problematic, as multiple copies of the user data (which can be as many as the number of online platforms that the user interacts with) are now stored on different servers on the Internet, which can also lead to data security problems when any one of these servers are attacked. When the user data is updated, the user will also have to manually update the copies stored on each of the online platforms. Thus, there is a need for providing a framework for securely managing user identities and data across different online platforms.

BRIEF DESCRIPTION OF THE FIGURES

FIG. 10 is a block diagram of a system for implementing a device according to an embodiment of the present disclosure.

Figure 1:
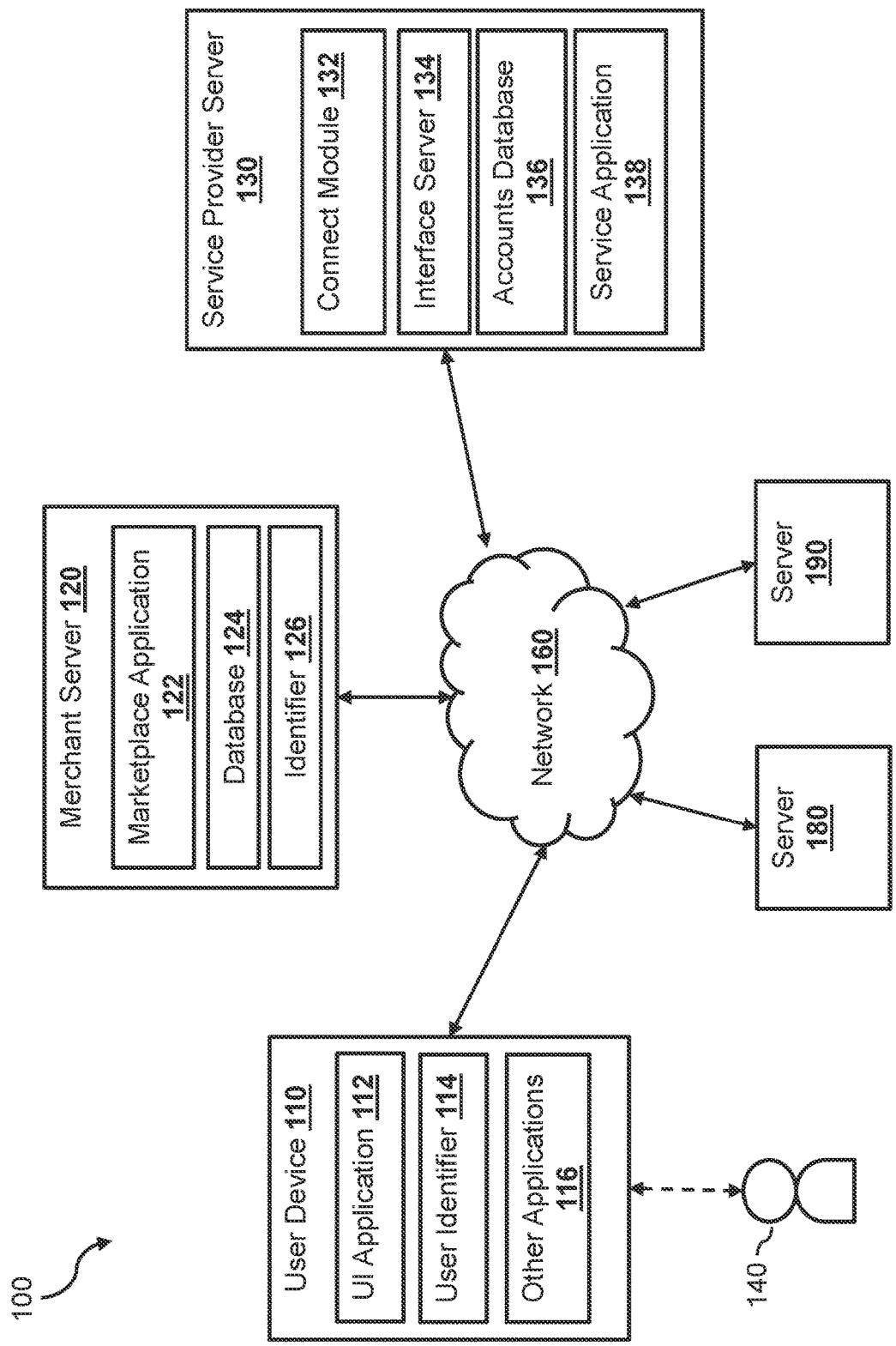
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating electronic transactions across multiple online platforms by dynamically managing and sharing user data. As discussed above, conducting electronic transactions with various online platforms can lead to many problems, including the inconvenience associated with requiring the users to repetitively provide the same information (e.g., the same shipping address, the same credit card information, etc.) to the same or different online platforms, and potential data leaks to unauthorized entities. Some of the online platforms have attempted to mitigate the problems by storing user data in their respective data storages (e.g., cloud servers, etc.). However, such a solution has many drawbacks as well. For example, due to the privacy rules associated with different jurisdictions, the online platforms that choose to store user data in their respective data storages may be required to acquire and/or use additional components (e.g., computer hardware and/or software, such as the usage of enhanced encryption techniques, having a separate and secured hardware memory space, etc.) to ensure the security of the user data. Furthermore, since the user data is stored in a data storage associated with a specific online platform, the user can only access the user data when the user conducts transactions with the same online platform. Furthermore, when multiple copies of the user data are stored in different data storages associated with different online platforms, the risk of having data leaks to or breaches by unauthorized entities also increases.

According to various embodiments of the disclosure, a connect system may dynamically and securely manage and share user data to facilitate electronic transactions between users and various online platforms. In some embodiments, the connect system may be independent from the online platforms, and may store user data associated with different users as the users conduct transactions with one or more online platforms. For example, the connect system may include a profile database that stores user profiles associated with various users. Each user profile may include user data associated with a corresponding user, which has been obtained through previous interactions with the corresponding user and/or with various online platforms and servers. The connect system may dynamically and securely share the user data in the user profiles with various online platforms when the same users conduct transactions with various online platforms.

In some embodiments, the connect system may include a client module that is integrated with different online platforms, such that the connect system may interact with the online platforms and the users while the users are accessing, interacting, and/or conducting transactions with the online platforms. The online platform of a merchant may include a website, a web portal, a mobile application, or other interfaces associated with the merchant. As a user accesses and/or conducts a transaction (e.g., a purchase transaction, a payment transaction, a registration transaction, etc.) with an online platform during an online session (e.g., a web session, etc.), the client module of the connect system may directly interact with the user via a user interface. For example, the client module may generate a user interface that is integrated with the interface of the online platform (e.g., a frame within the merchant website, etc.). The client module may then prompt, through the user interface, the user for an identifier (e.g., an email address, a phone number, etc.) usable to identify the user.

Based on the identifier, the connect system may determine whether the connect system includes a user profile that corresponds to the user. If no user profile corresponding to the user is found based on the identifier (e.g., the connect system has not stored any user data associated with the user), the client module may prompt the user for an indication of whether the user would like to opt in to a connect service offered by the connect system. If the user elects not to opt in to the connect service of the connect system, the client module will stop interacting with the user during the online session, and the user may continue to access the online platform and conduct a transaction with the online platform in a conventional manner.

On the other hand, if the user elects to opt in to the connect service of the connect system, the connect system may continue to interact with the user during the online session. The connect system may obtain user data associated with the user during the online session and store the user data in a user profile generated for the user, which may be used subsequently by the connect system to facilitate transactions between the user and the online platform (and/or other online platforms). In some embodiments, the connect system may first generate a user profile for the user. The user profile may include a data structure with multiple fields related to information usable in a transaction, such as a 'name' field, an 'age' field, a 'birthdate' field, a 'residential address' field, one or more 'billing address' fields, one or more 'financial instrument' fields, and other data fields. When the user profile was is generated, the connect system may include "null" values or default values for the fields. The new user profile may be linked to the identifier provided by the user, such that the user profile may be accessed by the connect system for facilitating subsequent transactions between the user and any online platforms based on the identifier.

The connect system, through the client module integrated within the online platform, may monitor the interactions between the user and the online platform. The connect system may also interact with the user and/or the online platform during the online session. Through the monitoring and interactions, the connect system may obtain user data associated with the user, and may insert the user data into the respective fields of the user profile. For example, after the user has elected to opt in to the connect service, the connect system may prompt the user for, or otherwise obtain, user data that is usable to complete the transaction with the online platform during the online session, and may store the user data in the user profile generated for the user.

If the transaction is a purchase transaction associated with the user purchasing an item from a merchant associated with the online platform, the client module may prompt the user for information that is usable for processing the purchase transaction, such as a shipping address for the transaction, a billing address for the transaction, funding instrument information for the transaction, etc. If the transaction is a payment transaction, the client module may prompt the user for funding instrument information for the transaction and a billing address for the transaction. If the transaction is a registration transaction, the client module may prompt the user for personal information such as a name, an age, a residential address, etc.

In some embodiments, the client module may provide a set of text input fields on the user interface integrated within the online platform to enable the user to input and submit the user data. When the user submits the user data via the user interface, the client module may intercept the user data, such that the user data is not be passed to the online platform. This way, the online platform is insulated from any user sensitive data, and therefore, is not required to provide advanced computer security components for storing and processing user data. The client module may transmit the intercepted user data to a server of the connect system for storing in the user profile of the user.

It has been contemplated that the user may have an existing user account associated with the online platform or another entity (e.g., a payment service provider, an issuer bank, etc.). For example, the user may have registered a user account with the online platform or another entity during a previous interaction with the online platform. By registering a user account with the online platform or the other entity, certain user data of the user may be stored with the online platform or the other entity (e.g., stored on a cloud server associated with the online platform or the other entity, etc.). The user data may include data that is usable for completing the transaction (e.g., the shipping address, the funding instrument information, etc.). During the online session with the online platform, the user may access the user data by logging in to the user account with the online platform or the other entity (e.g., a payment service provider, etc.).

As such, before prompting the user for the user data via the user interface, the client module of some embodiments may communicate with the online platform to determine whether the user is registered with the online platform and has logged into a user account with the online platform based on the identifier of the user. If the user is registered with the online platform, instead of prompting the user for the user data via the user interface, the client module may retrieve the user data of the user from the online platform, via the application programming interfaces (APIs) of the online platform. The client module may present the user data retrieved from the online platform, and may prompt the user to confirm whether the retrieved user data should be used for the transaction. If multiple sets of data (e.g., multiple shipping addresses, multiple billing addresses, multiple funding instruments, etc.) are retrieved from the online platform, the client module may present the multiple sets of data on the user interface, and may enable the user to select any one set of the data for use for the transaction. If the user confirms that the retrieved user data should be used or selects a set of the retrieved user data to be used for the transaction, the client module may transmit the retrieved user data (or the selected user data) to the server associated with the connect system.

On the other hand, if the user indicates that the retrieved user data should not be used for the transaction, the client module may provide an interface (e.g., text input fields) that enables the user to enter different user data for the transaction. The client module may then transmit the user data obtained from the interface to the server associated with the connect system. The different user data may be stored with the user profile for potential use in subsequent transactions via the connect system.

Similarly, before prompting the user for the user data via the user interface, the connect system of some embodiments may also communicate with a third-party entity server (e.g., a payment processing server, a bank server, etc.) to determine whether the user is registered with a third-party entity (e.g., a payment service provider, a bank, etc.), and has logged into a user account with the third-party entity based on the identifier of the user. If the user is registered with the third-party entity, instead of prompting the user for the user data via the user interface, the connect system may retrieve the user data of the user from the third-party entity server, via the APIs of the third-party entity server. The connect system may then cause the client module to present the user data retrieved from the third-party entity, and may prompt the user to confirm whether the retrieved user data should be used for the transaction. If multiple sets of data (e.g., multiple shipping addresses, multiple billing addresses, multiple funding instruments, etc.) are retrieved from the third-party entity, the client module may present the multiple sets of data on the user interface, and may enable the user to select any one set of the data for use for the transaction. If the user confirms that the retrieved user data should be used or selects a set of the retrieved user data to be used for the transaction, the client module may transmit the retrieved user data (or the selected user data) to the server associated with the connect system.

On the other hand, if the user indicates that the retrieved user data should not be used for the transaction, the client module may provide an interface (e.g., text input fields) that enables the user to enter different user data for the transaction. The client module may then transmit the user data obtained from the interface to the server associated with the connect system. Again, the different user data may be stored with the user profile for potential use in subsequent transactions via the connect system.

If the transaction is a purchase transaction or a payment transaction, the connect system may generate a payment token based on the user data, and transmit the payment token to the online platform. The payment token may be generated using a format that is compatible with a payment network, such that payment processing systems associated with an issuer bank and/or an acquirer bank can process the transaction using the payment token. The payment data may be encrypted or otherwise obfuscated before being encapsulated in the payment token, such that the payment data is not revealed to unauthorized parties (e.g., the merchant associated with the online platform, etc.). The payment token can be used by the online platform to complete the transaction (e.g., sending the payment token to the payment network to complete the settlement process). For example, upon receiving the payment token from the connect system, the online platform may transmit the payment token to a server associated with an acquirer bank via a payment network, where the server may continue to process the payment using the payment token, through a verification and settlement process.

In some embodiments, the connect system may also provide an identifier (e.g., the identifier provided by the user) to the online platform, such that the online platform can recognize the user when the user accesses the online platform subsequently. This way, the online platform can track user interactions of the user with the online platform anonymously without having to store any sensitive data associated with the user. For example, the online platform may track the user interactions of the user with the online platform during the online session (e.g., a browsing history, a purchase history, a product view history, etc.). When the user accesses the online platform again, the online platform may recognize the user based on the identifier (provided by the user or provided by the connect system the next time the user accesses the online platform). The online platform may continue to track the user interactions of the user with the online platform, and/or provide enhanced services to the user based on the previous user interactions of the user with the online platform (e.g., provide customized content, targeted incentives, etc.).

In some embodiments, upon receiving the user data from the client module, the connect system may store the user data in the corresponding data fields of the user profile associated with the user. The user data stored in the user profile may be used by the connect system to facilitate subsequent transactions conducted between the user and various online platforms. For example, when the user subsequently conducts another transaction with the same online platform or another online platform, the connect system may use the user data in the user profile of the user to facilitate the transaction between the user and the online platform, such that the user is not required to provide the same user data (e.g., the shipping address, funding instrument information, etc.) to the online platform to complete the transaction.

When the connect system detects that the user accesses and/or conducts a transaction with an online platform, the client module of the connect system may prompt, via the user interface, the user for the identifier that can be used to identify the user (e.g., an email address, a phone number, etc.). If the connect system has already generated a user profile for the user during a previous online session (e.g., a previous session between the user and the online platform, a previous session between the user and another online platform, etc.), the connect system may recognize the identifier, and may access the user profile associated with the user based on the identifier.

In some embodiments, before sharing the user data in the user profile with the online platform to facilitate the transaction between the user and the online platform, the connect system may perform an authentication process to authenticate the user. For example, the connect system may generate a one-time code for authenticating the user, and may transmit the one-time code to a user device based on the identifier of the user (e.g., a mobile device associated with the phone number, sending the one-time code to the email address, etc.). The client module may prompt, via the user interface, the user for the authentication code. For example, the client module may provide a text input field on the user interface that enables the user to enter an authentication code that the user received via the user device. Upon receiving the authentication code from the user, the connect system may determine whether the authentication code received from the user via the online platform matches the one-time code generated for the user. The connect system may authenticate the user when the authentication code matches the one-time code, and may share the data from the user profile with the online platform to facilitate the transaction between the user and the online platform.

Since the authentication process for authenticating the user with the connect system involves multiple steps (e.g., the connect system generating the one-time code, the connect system transmitting the one-time code based on the identifier, the user device receiving the one-time code, the user checking the one-time code from the user device, and the user entering and submitting the code, etc.), the authentication process may take a period of time (e.g., several seconds, several minutes, etc.) to complete. In some embodiments, in order to enhance the data sharing functionality, the connect system may pre-package the data from the user profile for transmitting to the online platform while the authentication process is being performed (e.g., before the user is authenticated). For example, after determining that the user profile associated with the user has been generated based on the identifier provided by the user, and before the user is authenticated, the connect system may retrieve the user profile, and generate a user profile package to be transmitted to the online platform based on the data from the user profile. The connect system may determine the type of transaction being conducted between the user and the online platform (e.g., a purchase transaction, a payment transaction, a registration transaction, etc.), and may retrieve the necessary data from the user profile that is required for completing the transaction.

The connect system may generate the user profile package based on the retrieved data. In some embodiments, generating the user profile package comprises encapsulating the data from the user profile into a token (e.g., a communication token that is different from the payment token). For example, the connect system may append the user profile package to the communication token, or may encode the data associated with the user profile package into the communication token. The communication token may have been used by the online platform, the client module of the connect system, and the server of the connect system for communicating with each other during the online session. For example, as the client module detects that the user is conducting a transaction with the online platform (e.g., accessing the website of the online platform, etc.) during an online session, the client module may transmit information (including a communication token that can identify the session, such as a unique value corresponding to the session, etc.) to the server of the connect system. Each time the online platform, the client module, and the server of the connect system communicates with each other, the sender of a message may include the communication token such that the receiver can correspond the message to the session and/or the user. In some embodiments, after retrieving the data from the user profile, the server of the connect system may modify the communication token by encapsulating the data in the communication token.

The server may prepare the modified communication token while the user is being authenticated. The server may store the modified communication token in a memory area that allows the server to quickly retrieve and transmit the modified communication token to the online platform and/or the user device once the user is authenticated. Once the user is authenticated (e.g., the user submitting an authentication code via the user interface of the online platform, and it is determined that the authentication code matches the one-time code generated for the session), the server of the connect system may transmit the data (e.g., the modified communication token) to the online platform and/or the client module on the user device.

Upon receiving the modified communication token, the client module may extract the data of the user profile from the modified communication token. Since the user has been identified by the connect system, instead of prompting the user for user data usable for the transaction, the client module may share the data from the user profile with the online platform to facilitate the transaction between the user and the online platform. For example, the client module may present, via the user interface of the online platform, the data from the user profile (e.g., the billing address, the residential address, the funding instrument, etc.). In some embodiments, the client module may prompt the user for a confirmation for using the data presented on the user interface in this transaction or to submit new user data for use in this transaction. If the user confirms using the data in this transaction, the client module may transmit data (including the modified communication token) back to the server of the connect system, indicating that the data from the user profile can be used for this transaction. If the user indicates that other information should be used for this transaction, the client module may provide text data fields on the user interface that enables the user to enter new information for use in this transaction. The client module may then intercept the new information provided by the user, and transmit the new information to the server, such that the server may store the new information as part of the user profile of the user.

By continuously monitoring user interactions with various online platforms and communicating with the various online platforms and/or other entities with which the user has registered, the connect system may obtain a large amount of user data that can be used to facilitate different types of transactions with different entities for the user. As such, the user profile may include multiple sets of data (e.g., multiple shipping addresses, multiple funding instruments, etc.) associated with the user that have been obtained from different entities (or used for conducting different types of transactions with the different entities). The large amount of data collected by the connect system and stored in the user profile may enable the connect system to provide enhanced data management and sharing services for the user. For example, when the connect system determines that a certain portion of the user data has been updated (e.g., the user updating a billing address or a residential address, an expired credit card has been updated with a renewed credit card, etc.), the connect system may also update the copies of the user data being stored on different servers of the entities by communicating the updated data to the different servers via corresponding APIs. Furthermore, the connect system may provide intelligence in selecting which portion of the user data should be shared with which online platform during a session (e.g., when the user accesses and/or conducts a transaction with an online platform), based on a variety of factors, such as an identity of the online platform (or the entity associated with the online platform), a type of transaction being conducted between the user and the online platform, a type of transaction being offered by the online platform, a location of the user, or other factors. As such, as the user accesses a particular online platform, the connect system may determine which set of data, from the data of the user profile associated with the user, should be shared with the online platform, and may retrieve only the set of data (and not other data from the user profile) for transmitting to the online platform.

In some embodiments, the connect system may use a machine learning model for selecting different sets of data to be shared with different online platforms. For example, as the user accesses the particular online platform, the connect system may obtain the relevant information (e.g., the identity of the online platform, the identity of the entity associated with the online platform, the location of the user, the type of transaction being offered by the online platform, etc.), and may provide the information to the machine learning model as input data. The machine learning model may be configured and trained (using historic data associated with the type of data the user has used in the past for conducting various transactions with different online platforms, etc.) to predict which set of data should be shared with the particular online platform. The enhanced intelligence in selecting only a portion of the data from the user profile to be shared with each particular online platform during a user access of the particular online platform further enhances the efficiency and security for the management and sharing of user data.

FIG. 1 illustrates an electronic transaction system 100, within which the connect system may be implemented according to one embodiment of the disclosure. The electronic transaction system 100 includes a service provider server 130, a merchant server 120, a user device 110, and servers 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120, the service provider server 130, and/or the servers 180 and 190 over the network 160. For example, the user 140 may use the user device 110 to conduct an online purchase transaction with the merchant server 120 via websites hosted by, or mobile applications associated with, the merchant server 120. The user 140 may also log in to a user account to access account services or conduct electronic transactions (e.g., data access, user registrations, account transfers, or electronic payments, etc.) with the service provider server 130. The user 140 may also log in to a user account to access account services or conduct electronic transactions (e.g., data access, user registrations, electronic payments, electronic purchase transactions, etc.) with any one of the servers 180 and 190. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, the merchant server 120, and/or the servers 180 and 190 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120, the service provider server 130, and/or the servers 180 and 190.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.).

While only one user device 110 is illustrated in FIG. 1, it has been contemplated that more than one user device (each having similar components as the user device 110 and capable to perform functions as the user device 110) may exist within the electronic transaction system 100.

The merchant server 120, in various embodiments, may be maintained by a business entity (or in some cases, by a partner of a business entity that processes transactions on behalf of business entity). Examples of business entities include merchants, resource information providers, utility providers, online retailers, real estate management providers, social networking platforms, a cryptocurrency brokerage platform, etc., which offer various items for purchase and process payments for the purchases. The merchant server 120 may include a merchant database 124 for identifying available items or services, which may be made available to the user device 110 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or a user of another user device) may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

Each of the servers 180 and 190 may be maintained by an entity, such as another service provider (e.g., a payment service provider), another merchant, a bank (e.g., an issuer bank, an acquirer bank, etc.). As such, each of the servers 180 and 190 may include substantially the same hardware and/or software components as the merchant server 120. The user 140, via the user device 110 may register a user account (e.g., a bank account, a credit card account, a merchant account, etc.), and may conduct various transactions with each of the servers 180 and 190. Thus, each of the servers 180 and 190 may store user data associated with the user (e.g., bank account information, credit card information, etc.), and may be used by the user to conduct transactions with the servers 180 and 190, the merchant server 120, and/or the service provider server 130.

The service provider server 130, in one embodiment, may be maintained by a transaction processing entity or an online service provider, which may provide processing of electronic transactions between users (e.g., the user of the user device 110) or between the users and one or more merchants. As such, the service provider server 130 may include a service application 138, which may be adapted to interact with the user device 110, the merchant server 120, and/or the servers 180 and 190 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an accounts database 136, each of which may include account information associated with one or more individual users (e.g., the user 140 associated with user device 110, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a connect module 132 that implements the connect system as discussed herein. The connect module 132 may be configured to dynamically manage and share user data associated with various users (e.g., the user 140) with other entities (e.g., the merchant associated with the merchant server 120, the entities associated with the servers 180 and 190, etc.). For example, the connect module 132 may obtain user data of the user through various means, such as via prompting the user for the user data while the user is accessing an online platform (e.g., a merchant website associated with the merchant server 120), or retrieving the user data from a user account of the user registered with the merchant server 120, the serve 180, and/or the server 190. The connect module 132 may store the user data in a user profile associated with the user, and may then facilitate sharing of the user data when the user subsequently conducts transactions with various online platforms.

Figure 2:
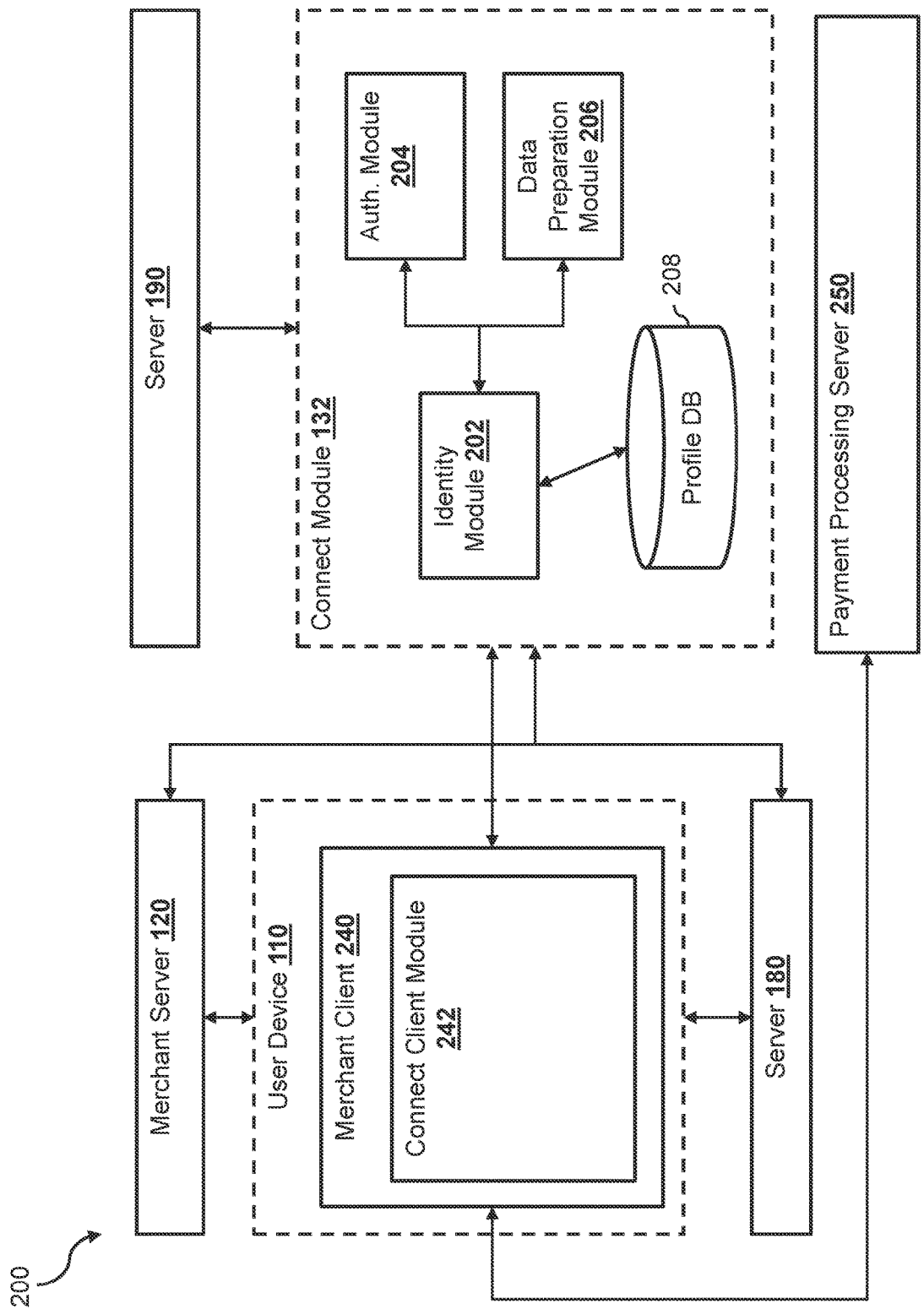
FIG. 2 is a block diagram illustrating a computing environment in which a connect system may operate according to an embodiment of the present disclosure.

FIG. 2 illustrates a computing environment 200 in which the connect module 132 may operate to dynamically manage and share user data with various online platforms according to various embodiments of the disclosure. In some embodiments, the connect system May include the connect module 132 that is implemented within a server (e.g., the service provider server 130) and one or more connect client modules (e.g., a connect client module 242) that is integrated within one or more corresponding online platforms. As shown in FIG. 2, the connect module 132 is communicatively coupled to the user device 110, the merchant server 120, and the servers 180 and 190 (e.g., via the network 160 as illustrated in FIG. 1). The user device 110, according to various embodiments, may include a merchant client 240. The merchant client 240 may correspond to an online platform associated with a merchant (e.g., the merchant associated with the merchant server 120, or an entity associated with the server 180 or the server 190, etc.). In some embodiments, the merchant client 240 may correspond to, or be executed within, the UI application 112. For example, the merchant client 240 may be a mobile application that interfaces with the user 140 via a user interface of the user device 110. In another example where the UI application 112 is a web browser application, the merchant client 240 may be a web application that is executed within the UI application 112.

As discussed herein, the connect system of some embodiments may include client modules that are integrated with different online platforms (e.g., a client module may be integrated within each of the online platforms). In this example, the connect system includes the connect client module 242 that is integrated within the merchant client 240 (e.g., via a software development kit (SDK), etc.). As such, the connect module 132 may communicate and/or interact with the merchant client 240 via the connect client module 242. For example, the connect client module 242 may provide a separate user interface on the user device 110 to directly interact with the user 140. The user interface provided by the connect client module 242 may be integrated within the interface of the merchant client (e.g., a frame such as an iFrame within a merchant website, etc.). The connect client module 242 may prompt the user 140 for specific information, monitor the user interactions with the merchant client 240, obtain data from the user 140, etc. The connect client module 242 may also communicate with the merchant client 240, for example, via an application programming interface (API) of the merchant client 240.

As shown in FIG. 2, the connect module 132 may include an identity module 202, an authentication module 204, a data preparation module 206, and a profile database 208. As the user 140 accesses the merchant client 240 (e.g., accessing a merchant website associated with the merchant client 240, accessing a merchant mobile application, etc.), the connect client module 242 may begin monitoring user interactions of the user 140 with the merchant client 240 during an online session (e.g., a web session, a mobile application session, etc.). In some embodiments, as the connect client module 242 detects that the user has started accessing the merchant client 240 (e.g., using the UI application 112), the connect client module 242 may generate a communication token (which is different from other types of tokens, such as the payment tokens, described herein) for identifying the online session between the user 140 and the merchant client 240. The communication token may encapsulate session data associated with the online session and a session identifier that identifies the online session. For example, the session data (e.g., a session identifier, identities of the parties associated with the online session, device information of the devices used in the online session, etc.) may be encoded within the communication token. The connect client module 242 may use the communication token to communicate with the connect module 132 over a network (e.g., the network 160). For example, the connect client module 242 may include the communication token in every communication transmitted to the connect module 132, and the connect module 132 may also include the communication token in every communication transmitted back to the connect client module 242. Since the connect module 132 may simultaneously communicate with different connect client modules that are integrated within different online platforms, by including the communication token within each communication, the connect module 132 may identify, for each communication, which online session and which connect client module correspond to the communication.

In some embodiments, during the online session, the identity module 202 may instruct the connect client module 242 to provide a user interface through the merchant client and displayed on the user device 110, and may prompt the user 140 for an identifier usable for identifying the user 140. The identifier may identify a device or a network address associated with the user, such as a phone number, an e-mail address, etc. After obtaining the identifier, the connect client module 242 may transmit the identifier to the connect module 132. For example, the connect client module 242 may embed the identifier into the communication token generated for the online session, and may transmit the communication token (with the identifier embedded therein) to the connect module 132.

In some embodiments, the connect client module 242 and the connect module 132 may use the identifier to track the user 140 and to facilitate the sharing of user data across one or more online platforms. For example, the connect module 132 may store identifiers of users who have registered with the connect module 132 and/or opted in to the connect service with the connect module 132 in the past, such that the identity module 202 may identify the user (e.g., the user 140) based on the identifier when the user accesses an online platform. The connect module 132 may also store user profiles associated with different users who have registered with the connect module 132 and/or opted in to the connect service with the connect module 132 in the past. Each user profile may be linked to the identifier of the corresponding user (e.g., included in the user profile as a primary key of a record, etc.), and may store user data associated the corresponding user that is usable for facilitating transactions between the corresponding user and different online platforms.

Thus, upon obtaining the identifier of the user 140, the identity module 202 may determine whether the identifier is associated with any of the user profiles stored in the profile database 208. If no user profile in the profile database 208 is linked to the identifier, the identity module 202 may determine that the user 140 may be a new user to the connect module 132, may not have previously registered with or opted in to the connect service with the connect module 132, or may have previously opted out of the connect service with the connect module. As such, the identity module 202 may instruct the connect client module 242 to prompt the user 140, through the user interface, for an indication of whether the user 140 would like to register with or opt in to the connect service with the connect module 132 (e.g., by embedding a 'no profile linked to user' signal within the communication token, and transmitting the communication token to the connect client module 242, etc.). If the user 140 indicates to the connect client module 242, via the user interface, that the user 140 would not like to register with or opt in to the connect service with the connect module 132, the connect client module 242 may abort interacting with the user 140 during the online session, such that the user 140 may interact with the merchant client 240 in a conventional manner (e.g., to access data associated with the merchant server 120, such as browsing of items offered for sale by the merchant, to conduct a transaction with the merchant server 120 through the merchant client 240, etc.).

On the other hand, if the user indicates to the connect client module 242, via the user interface, that the user 140 would like to register with or opt in to the connect service with the connect module 132, the connect client module 242 may transmit a 'confirmation' signal to the connect module 132, for example, by embedding an 'opt-in' signal within the communication token and transmitting the communication token to the connect module 132. Based on the 'opt-in' signal embedded within the communication token, the identity module 202 may generate, for the user 140, a user profile that is linked to the identifier provided by the user 140 (e.g., by storing the identifier in a field of the user profile, by generating a new entry in a hash table based on the identifier that points to the user profile in the profile database 208, etc.).

After generating the user profile for the user 140, the connect client module 242 may continue to monitor user interactions between the user 140 and the merchant client 240 during the online session. In some embodiments, when the connect client module 242 detects that the user 140 has initiated a transaction (e.g., a data access transaction, a purchase transaction, a payment transaction, etc.) with the merchant via the merchant client 240 during the online session, the connect client module 242 may prompt, via the user interface provided by the connect client module 242, the user 140 for user data usable for conducting the transaction. For example, if the transaction is a payment transaction, the connect client module 242 may prompt the user 140 for funding instrument data associated with a funding instrument (e.g., a bank account, a credit card, a debit card, a billing address, etc.). In another example, if the transaction is a purchase transaction, the connect client module 242 may prompt the user for a shipping address for shipping an item associated with the purchase transaction, funding instrument data associated with a funding instrument (e.g., a bank account, a credit card, a debit card, a billing address, etc.), an age (if the purchase transaction has an age limitation), and other information related to the purchase transaction.

Since the user interface, through which the user provides the user data, is provided by the connect client module 242, the communication exchanged between the user 140 and the connect client module 242 through the user interface is insulated from and is inaccessible by the merchant client 240. As such, the merchant client 240 may not have access to the user data provided by the user 140 unless the connect client module 242 transmits (e.g., through the API of the merchant client 240) the user data to the merchant client 240. Such a feature enables the merchant client (and therefore, the merchant associated with the merchant server 120) to be insulated from the data received from the user 140 and usable for the transaction. As discussed herein, since the user data may include sensitive information (e.g., personal identifiable information, payment instrument information, etc.), the merchant may avoid having to provide the necessary computer components to ensure the privacy and security of the user data, as required by different jurisdictions, based on the connect client module 242 insulating the merchant client from accessing the user data.

In some embodiments, the connect client module 242 may intercept the user data provided by the user 140 without allowing the user data to pass to the merchant client 240. The connect client module 242 may transmit the user data to the connect module 132 (e.g., by embedding the user data into the communication token, and transmitting the communication token to the connect module 132). The connect module 132 may store the user data in the respective fields of the user profile generated for the user 140, such that the user data can be used/shared with the merchant server 120 and/or other entities subsequently for facilitating transactions associated with the user 140.

In some embodiments, when the transaction involves a payment from the user 140 to another entity (e.g., the merchant associated with the merchant server 120, another user, etc.), the connect module 132 may generate a payment token that can be used to facilitate a payment transaction over a payment network. The connect module 132 may generate the payment token according to a standard format used by various payment processors within the payment network, such that the payment token can be interpreted and processed by a corresponding payment processor. Funding instrument data corresponding to a funding instrument indicated by the user 140 is also embedded within the payment token in a way that can only be extracted using a specific algorithm known by the corresponding payment processor, such that any intermediate parties (except the payment processor) that may have access to the payment token would not be able to access the funding instrument data.

The connect module 132 may transmit the payment token to the connect client module 242 (e.g., by appending the payment token to the communication token and transmitting the communication token back to the connect client module 242). The connect client module 242 may then extract the payment token from the communication token, and may pass the payment token to the merchant client 240 to complete the payment transaction. For example, the merchant client 240 may then transmit the payment token to a payment processing server 250 via a payment network (that is different from the network 160 and connects only the computer systems involved in electronic payment services, such as issuer banks, acquirer banks, etc.). The payment processing server 250 may complete the payment transaction (e.g., transferring funds from an account associated with the user 140 to an account associated with the merchant) based on the payment token.

In some embodiments, instead of prompting the user 140 for the user data via the user interface presented on the user device 110, the connect module 132 may obtain the user data from other servers that store information associated with the user 140. For example, the user 140 may have registered an account with the merchant server 120, any one of the servers 180 and 190 (which may be another merchant server, a payment processing service provider server, a service provider server, etc.), or the payment processing server 250. As such, the user may have provided user data to one or more of these other servers during one or more previous interactions of the user 140 with these servers. As such, after determining that the user 140 is not currently registered with the connect module 132 and before prompting the user 140 for the user data usable for facilitating the transaction, the connect module 132 may determine whether the user 140 has registered an account with another server. The connect module 132 may query the merchant server 120 for the user data based on the identifier provided by the user 140 via the merchant client 240. If the user 140 has previously shared any user data with the merchant server 120 (e.g., during a previous transaction conducted with the merchant server 120, has registered a user account with the merchant server 120, etc.), the connect module 132 may retrieve the user data from the merchant server 120.

Similarly, the connect module 132 may also query the servers 180 and 190, and/or the payment processing server 250 for the user data of the user 140 based on the identifier. In some embodiments, at least one of the server 180, the server 190, or the payment processing server 250 may correspond to a service provider associated with the service provider server 130. If the user 140 has previously registered a user account with any one of the server 180, the server 190, or the payment processing server 250, the connect module 132 may retrieve the user data from the server 180, the server 190, or the payment processing server 250.

Upon retrieving the user data, the connect module 132 may transmit the user data to the connect client module 242 (e.g., by using the communication token using the techniques described herein), such that the connect client module 242 may present the user data on the user interface. The connect client module 242 may also prompt the user for a confirmation of whether the user data retrieved from the third-party server should be used for this transaction. If the user confirms that the user data should be used for this transaction, the connect client module 242 may transmit the user data back to the connect module 132, as if the user data was provided by the user 140. The connect module 132 may then store the user data in the user profile generated for the user 140 as described herein.

On the other hand, if the user 140 indicates that the user data retrieved from the third-party server should not be used for this transaction, the connect client module 242 may enable the user to provide the user data (e.g., by providing text input fields on the user interface), and may transmit the user data provided by the user to the connect module 132. The user data used for the transaction may be stored with the user profile for potential use in subsequent transactions via the connect module 132.

After storing the user data in the user profile associated with the user 140, and linked to the identifier associated with the user 140, the connect module 132 and the connect client module 242 may facilitate sharing of the user data during subsequent transactions between the user and another entity. For example, after the user profile has been generated for the user 140, the user 140 may subsequently use the user device 110 to access the merchant client 240 or another online platform associated with another merchant server (e.g., another merchant website or another merchant mobile application associated with other servers such as the servers 180, 190, etc.). An online session may also be established between the user device and the online platform. Upon detecting the user 140 accessing the online platform in a subsequent online session, the connect client module 242 that is integrated within the online platform may prompt the user 140 for an identifier. The connect client module 242 may transmit the identifier (embedded within a communication token generated for this subsequent online session) to the identity module 202 of the connect module 132. Since a user profile has been generated for the user 140 and linked to the identifier, the identity module 202 may determine that the user 140 has been registered with the connect module 132 and/or opted in for the connect service of the connect module 132 based on the user profile that is linked to the identifier.

In some embodiments, the authentication module 204 may communicate with the connect client module 242 to initiate an authentication process for authenticating the user 140 based on the identifier provided by the user 140. The authentication process may be implemented in different ways. For example, the connect client module 242 may prompt the user for a passcode that has been set up during the previous registration process of the user 140 with the connect module 132. In another example, the authentication module 204 may generate an authentication code (e.g., a string of numerals and/or letters, etc.) for the authentication process, and may transmit the authentication code to a device associated with the user 140 (e.g., the user device 110) based on the identifier. If the identifier corresponds to the phone number, the authentication module 204 may transmit the authentication code to a device that corresponds to the phone number (e.g., via a short message service (SMS), etc.). On the other hand, if the identifier corresponds to an email address, the authentication module 204 may transmit the authentication code to the email address via an email message. The authentication module 204 may also instruct the connect client module 242 to prompt the user 140 for a code on the user device 110, for example, via a text input field provided on a user interface presented on the user device 110.

While the user 140 is being authenticated (e.g., while waiting for the user 140 to provide the passcode, while the user 140 is retrieving the authentication code transmitted by the authentication module 204 and providing the code to the connect client module 242), the data preparation module 206 may prepare the user data to be shared with the merchant client 240 (or another online platform accessed by the user 140). In some embodiments, the data preparation module 206 may retrieve the user data from the user profile associated with the user 140. The data preparation module 206 may generate a package based on the user data retrieved from the user profile, and may encapsulate the package to the communication token corresponding to the online session (e.g., append the package to the communication token corresponding to the online session, etc.). However, since the user 140 has not been authenticated at this point, the connect module 132 may suspend the transmission of the communication token (that includes the package) to the connect client module 242 until the user 140 is authenticated.

When the connect client module 242 receives the code or the passcode from the user 140 via the user interface, the connect client module 242 may transmit the code or the passcode to the connect module 132 (e.g., appending the code to the communication token and transmitting the communication token to the connect module 132). Upon receiving the code or the passcode, the authentication module 204 may determine whether the user 140 is authenticated by verifying the passcode or comparing the code received from the user 140 and the authentication code generated for the online session. If the passcode is not verified or the code received from the user 140 does not match the authentication code, the authentication module 204 may determine that the user 140 is not authenticated, and may withhold the package from being transmitted to the connect client module 242.

If the passcode is verified or the code received from the user 140 matches the authentication code, the authentication module 204 may determine that the user is authenticated, and may transmit the communication token (with the package including the user data) to the connect client module 242. The connect client module 242 may extract the user data from the communication token, and may present the user data on the user device 110 via a user interface provided on the user device 110. The connect client module 242 may prompt the user 140 to confirm whether the user data retrieved from the user profile should be used for this transaction. If the user 140 confirms that the user data should be used for this transaction, the connect client module 242 may transmit the user data (or a confirmation signal) back to the connect module 132. The connect module 132 may then store the user data in the user profile generated for the user 140 as described herein.

On the other hand, if the user 140 indicates that the user data retrieved from the third-party server should not be used for this transaction, the connect client module 242 may enable the user to provide user data (e.g., by providing text input fields on the user interface), and may transmit the user data provided by the user 140 to the connect module 132. The connect module 132 may then update the user profile of the user 140 based on the new user data provided by the user 140 during the online session. Again, the user data used for the transaction may be stored with the user profile for potential use in subsequent transactions via the connect module 132.

As discussed herein, the connect module 132 may facilitate management and sharing of the user data with different online platforms. As such, the connect module 132 is configured to facilitate the sharing of the user data with different online platforms (e.g., the merchant client 240, other online platforms associated with the server 180, the server 190, etc.) for processing transactions between the user 140 with the different online platforms. Since the user may wish to use different user data (e.g., use different funding instruments, different shipping addresses, etc.) for different recipients (e.g., different merchants or recipient users), for different types of transactions (e.g., whether it is a payment transaction, a purchase transaction, etc.), and/or for different types of products involved in the transaction, the connect module 132 may obtain multiple sets of user data from the user 140 through different online sessions between the user 140 and the different online platforms, and may store the multiple sets of user data in the user profile.

In some embodiments, the connect module 132 may dynamically share different sets of user data with different online platforms to facilitate the transactions between the user and the online platforms. For example, after receiving the identifier from the user 140 during an online session, the connect client module 242 may communicate with the online platform associated with the online session (e.g., the merchant client 240 or another online platform, etc.) to determine information about the online session, such as an identity of the merchant, an identity of a recipient, a type of transaction (e.g., account access, data access, purchase of a service or content, transfer of funds, etc.) being conducted between the user 140 and the merchant, a type of product being involved in the transaction, etc. The connect client module 242 may transmit the information about the online session (and in some embodiments, along with the identifier) to the connect module 132. Upon receiving the information, the data preparation module 206 may prepare a package based on the user data included in the user profile associated with the user 140 for sharing with the online platform. In some embodiments, when the user profile includes different sets of user data that can be used in a transaction between the user 140 and the online platform, the data preparation module 206 may select a set of user data from the different sets of user data in the user profile, for example, based on the information about the online session.

In some embodiments, the data preparation module 206 may analyze historic data associated with how the user 140 uses the user data in previous transactions with various online platforms to select the set of user data to be used for the online session. In some embodiments, the data preparation module 206 may configure and train a machine learning model to predict which set of user data (e.g., which funding instrument, which shipping address, etc.) to use for the online session based on the historic data. Thus, the data preparation module 206 may provide the information about the online session as input data to the machine learning model, and may obtain an indication from the machine learning model regarding which set of user data from the user profile to be used for the online session. The data preparation module 206 may then prepare a package based on the selected set of user data (which may include data associated with a selected funding instrument, a selected shipping address, etc.). The data preparation module 206 may transmit the package to the connect client module 242 (e.g., embedded within a communication token) after the user is authenticated.

In addition to sharing the user data for facilitating transactions between users and online platforms, the connect module 132 of some embodiments is also configured to update any existing user data that is stored on the various entity servers (e.g., the merchant server 120, the servers 180 and 190, etc.). In some embodiments, when the connect module 132 determines that certain user data (e.g., a first version of user data) of the user 140 is stored on a server associated with an online platform (e.g., on the merchant server 120 associated with the merchant client 240) while the user 140 is accessing the online platform, the connect module 132 may verify the accuracy of the first version of user data on the server based on the user data of the user profile (e.g., a second version of user data) stored in the profile database 208 and associated with the user 140. For example, the connect module 132 may compare the first version of user data against the second version of user data. If there is a discrepancy between the first version of user data and the second version of user data (e.g., a discrepancy of the expiration date possibly due to the user 140 having renewed a funding instrument or an identification card, a discrepancy of an account number due to the user 140 having updated the funding instrument, a discrepancy of the shipping address due to a change of residency of the user 140, etc.), the connect module 132 may determine which version of user data is more accurate (e.g., based on a timestamp associated with the user data), and update the user data that is not current. If the connect module 132 determines that the first version of user data is more accurate (e.g., more current), the connect module 132 may update the second version of user data of the user profile stored in the profile database 208 using the first version of user data. If the connect module 132 determines that the second version of user data is more accurate (e.g., more current), the connect module 132 may transmit the first version of user data to a corresponding connect client module 242 executed within the online platform, and instruct the online platform to update the first version of user data stored on the server using the second version of user data. By continually accessing different copies (or versions) of user data stored on different servers and updating the different copies of user data, the connect module 132 may ensure that the user data stored on various servers or devices are current and consistent with each other, without requiring the user 140 to perform any actions.

Figure 3:
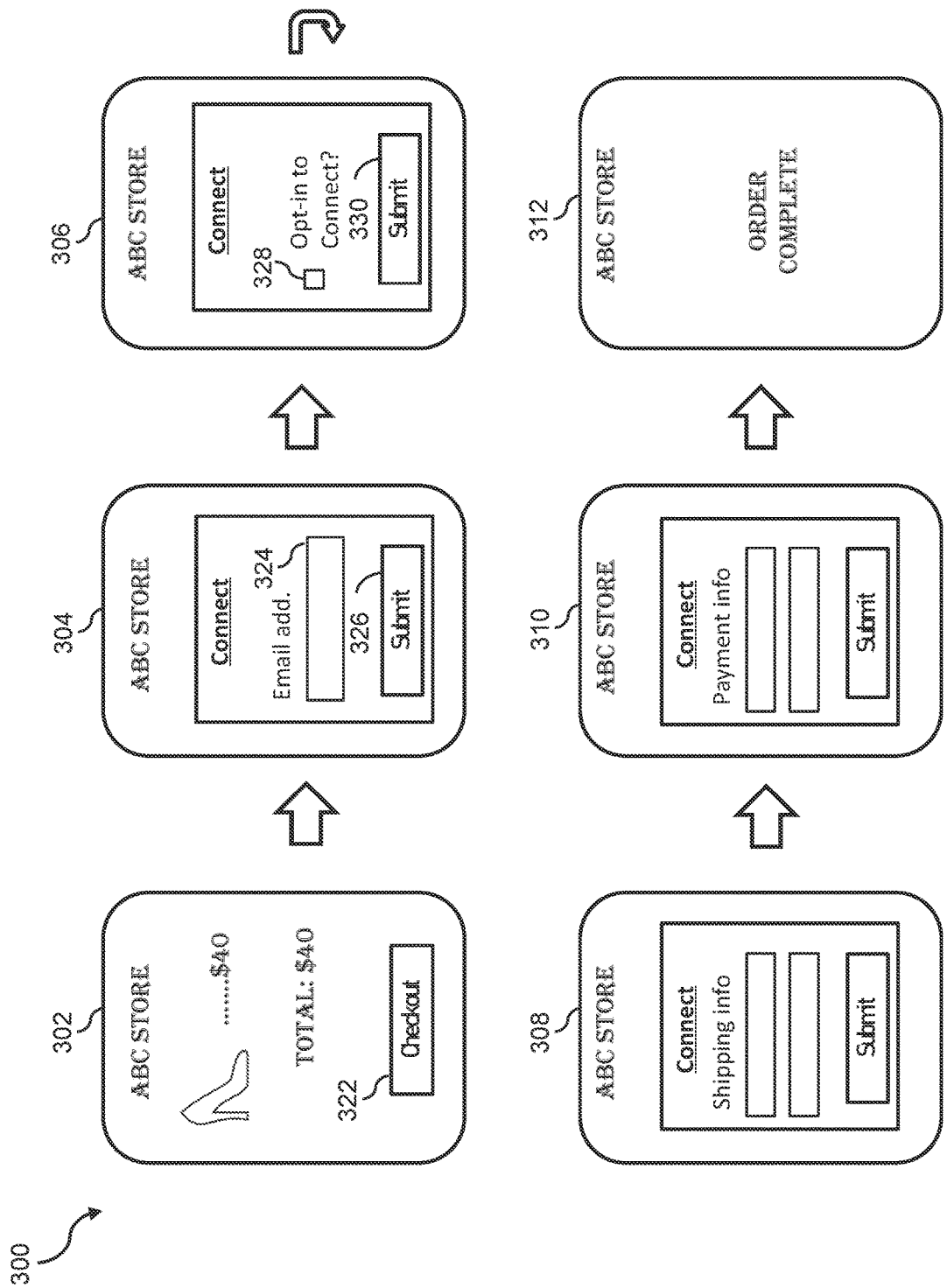
FIG. 3 illustrates an example user interface flow for generating a user profile for a user according to an embodiment of the present disclosure.

FIG. 3 illustrates a progression 300 of interfaces 302-312 provided by the connect system when the user has not opted in to the connect service according to various embodiments of the disclosure. The progression 300 begins with an interface 302, during which the user 140 is accessing an online platform (e.g., the merchant client 240). In this example, the merchant client 240 may provide a user interface that enables the user 140 to interact with the merchant client 240 (e.g., browse products offered for sale by a merchant associated with the merchant client 240, access data associated with the merchant client 240, initiate and conduct a transaction with the merchant via the merchant client 240, etc.). As shown in the interface 302, the merchant client 240 is associated with a merchant that sells shoes, and the user 140 has selected a particular pair of shoes for purchase from the merchant via the merchant client 240. The interface 302 also includes a "checkout" selectable element 322 that enables the user to initiate a purchase transaction with the merchant for the selected pair of shoes. In some embodiments, a connect client module (e.g., the connect client module 242) may be integrated within the merchant client 240. As such, the connect client module 242 may detect that the user 140 is accessing the online platform.

In some embodiments, in response to detecting that the user 140 is accessing the merchant client 240, the connect client module 242 may generate a user interface that is separate and insulated from the user interface provided by the merchant client 240 for directly interacting with the user 140. The user interface provided by the connect client module 242 may be integrated within the interface provided by the merchant client 240 (e.g., a frame, such as an iFrame, within a merchant website of the merchant). In this example, the connect client module 242 provides an interface 304 for prompting the user for an identifier. As shown, the interface 304 includes a text input field 324 that enables the user 140 to enter an identifier (and in this example, an e-mail address) usable to identify the user. After providing the identifier in the text input field 324, the user 140 may submit the identifier to the connect client module 242 by selecting a "submit" selectable element 326. Upon receiving the identifier from the user, the connect client module 242 may transmit the identifier to the connect module 132. The connect module 132 may determine whether a user profile exists for the user 140 in the profile database 208.

In this example, the connect module 132 determines that no user profile exists for the user 140, and thus, instructs the connect module 132 to prompt the user 140 for an indication of whether the user 140 wants to opt in to the connect service of the connect module 132. As such, the connect client module 242 may provide an interface 306 for prompting the user 140 to indicate whether the user 140 wants to opt in to the connect service. In this example, the interface 306 includes a selectable box 328 for indicating whether the user 140 wants to opt in to the connect service. The user 140 may check the selectable box 328 and select the "submit" selectable element 330 to indicate the desire to opt in to the connect service.

After the user 140 has selected to opt in to the connect service, the connect client module 242 provides interfaces 308 and 310 on the user device 110 for obtaining user data from the user 140. For example, the user may provide a shipping address to the connect client module 242 in the interface 308, and funding instrument data (e.g., a credit card number, etc.) to the connect client module 242 in the interface 310. The connect client module 242 may transmit the user data obtained from the user 140 via the interfaces 308 and 310 to the connect module 132, which in turn, may store the user data in the user profile associated with the user 140. It is noted that in some embodiments, the interface 306 may be provided after the connect client module 242 obtains the shipping information and payment information from the user 140 via the interfaces 308 and 310. The connect module 132 may also generate a payment token for the transaction based on the user data, and may transmit the payment token to the connect client module 242. The connect client module 242 may transmit the payment token to the merchant client 240 such that the merchant client (or the merchant server 120) may complete the transaction by transmitting the payment token to the payment processing server 250 via a payment network. The connect client module 242 may also terminate the user interface (or pass the control of the user interface back to the merchant client 240), which enables the user 140 to interact directly with the merchant client 240. After the purchase transaction has been processed, the merchant client 240 may provide the interface 312 to indicate that the purchase order has been process.

Figure 4:
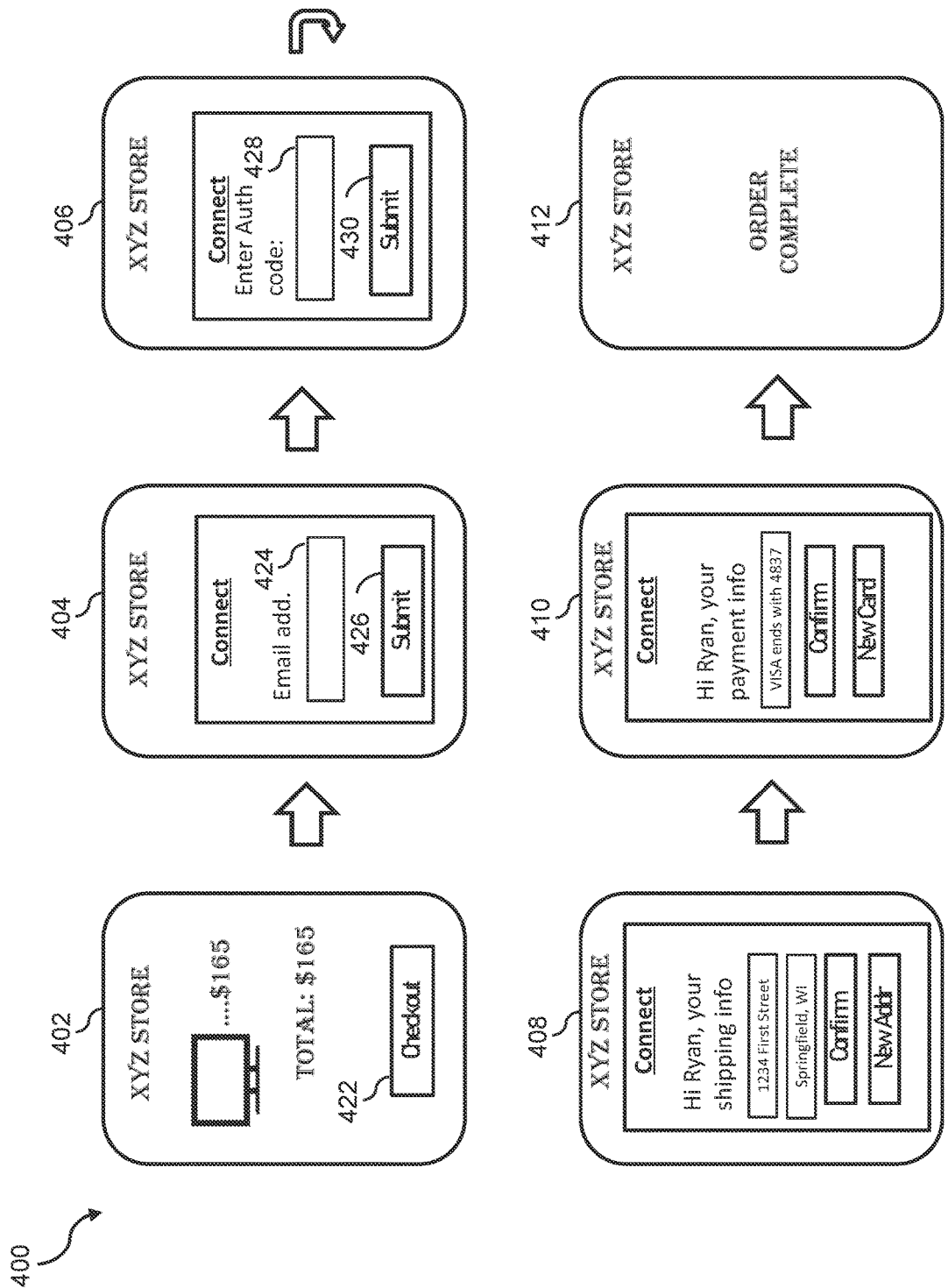
FIG. 4 illustrates an example user interface flow for sharing user data from a user profile of a user according to an embodiment of the present disclosure.

FIG. 4 illustrates a progression 400 of interfaces 402-412 provided by the connect system after the user has opted in to the connect service according to various embodiments of the disclosure. The progression 400 begins with an interface 402, during which the user 140 is accessing an online platform (e.g., the merchant client 240 or another online platform). In this example, the merchant client 240 may provide a user interface that enables the user 140 to interact with the merchant client 240 (e.g., browse products offered for sale by a merchant associated with the merchant client 240, access data associated with the merchant client 240, initiate and conduct a transaction with the merchant via the merchant client 240, etc.). In this example as shown in the interface 402, the merchant client 240 is associated with a merchant that sells electronics, and the user 140 has selected a monitor for purchase from the merchant via the merchant client 240. The interface 402 also includes a "checkout" selectable element 422 that enables the user to initiate a purchase transaction with the merchant for the selected monitor. In some embodiments, a connect client module (e.g., the connect client module 242) may be integrated within the merchant client 240. As such, the connect client module 242 may detect that the user 140 is accessing the online platform.

In some embodiments, in response to detecting that the user 140 is accessing the merchant client 240, the connect client module 242 may generate a user interface (that may include the interfaces 404, 406, 408, and 410 in this example) that is separate and insulated from the user interface provided by the merchant client 240 for directly interacting with the user 140. For example, upon detecting that the user 140 is accessing the online platform or that the user has selected the "checkout" selectable element 422 in the interface 402, the connect client module 242 may provide an interface 404 for prompting the user 140 for an identifier. In this example, the user interface provided by the connect client module 242 includes a text input field 424 for prompting the user for an identifier (and in this example, an e-mail address) usable to identify the user. After providing the identifier in the text input field 424, the user may submit the identifier to the connect client module 242 by selecting a "submit" selectable element 426. Upon receiving the identifier from the user, the connect client module 242 may transmit the identifier to the connect module 132. The connect module 132 may determine whether a user profile exists for the user 140 in the profile database 208.

In this example, since the connect module 132 has generated a user profile for the user 140 during a previous interaction of the user 140 with an online platform (which may be the same as or different from the online platform that the user 140 is accessing), the connect module 132 determines that a user profile exists for the user 140. The authentication module 204 may initiate an authentication process for authenticating the user 140 in this online session. For example, the authentication module 204 may generate an authentication code, and may transmit the authentication code to a device of the user 140 based on the identifier of the user. The authentication module 204 may also instruct the connect client module 242 to prompt the user 140 for a code.

As such, the connect client module 242 may provide an interface 406 for prompting the user 140 for a code, via a text input field 428. While awaiting the user 140 to provide the code via the interface 406, the data preparation module 206 may prepare a package to be shared with the merchant client 240 for facilitating the transaction between the user 140 and the merchant based on the user data from the user profile. The connect module 132 may suspend the transmission of the package to the connect client module 242 until the user 140 is authenticated.

When the user 140 provides the code via the text input field 428 and selects the "submit" selectable element 430 on the interface 406, the connect client module 242 may transmit the code to the connect module 132. The connect module 132 may compare the code received from the user 140 and the authentication code generated by the authentication module 204, and may determine that the user 140 is authenticated when the codes match. Upon successfully authenticating the user 140, the connect module 132 may transmit the package including the user data of the user 140 to the connect client module 242. The connect client module 242 then displays the user data on interfaces 408 and 410 such that the user 140 may confirm whether to use the user data to complete the transaction with the merchant client 240.

Specifically, the interface 408 presents the shipping address information of the user 140 and the interface 410 presents the funding instrument information of the user 140. Via the interfaces 408 and 410, the user 140 may confirm to use the user data for the transaction, or provide new user data (e.g., a new shipping address, a new funding instrument, etc.) to be used for the transaction. The connect module 132 may generate a payment token for the transaction based on the user data (e.g., either the user data stored in the user profile or the new user data provided by the user 140 through the interfaces 408 and 410). The connect module 132 may transmit the payment token to the connect client module 242, which in turn, may transmit the payment token to the merchant client 240 such that the merchant client (or the merchant server 120) may complete the transaction by transmitting the payment token to the payment processing server 250 via a payment network. The connect client module 242 may also terminate the user interface, which enables the user 140 to interact directly with the merchant client 240. After the transaction has been processed, the merchant client 240 may provide an interface 412 to indicate to the user 140 that the purchase transaction has been processed.

Figure 5:
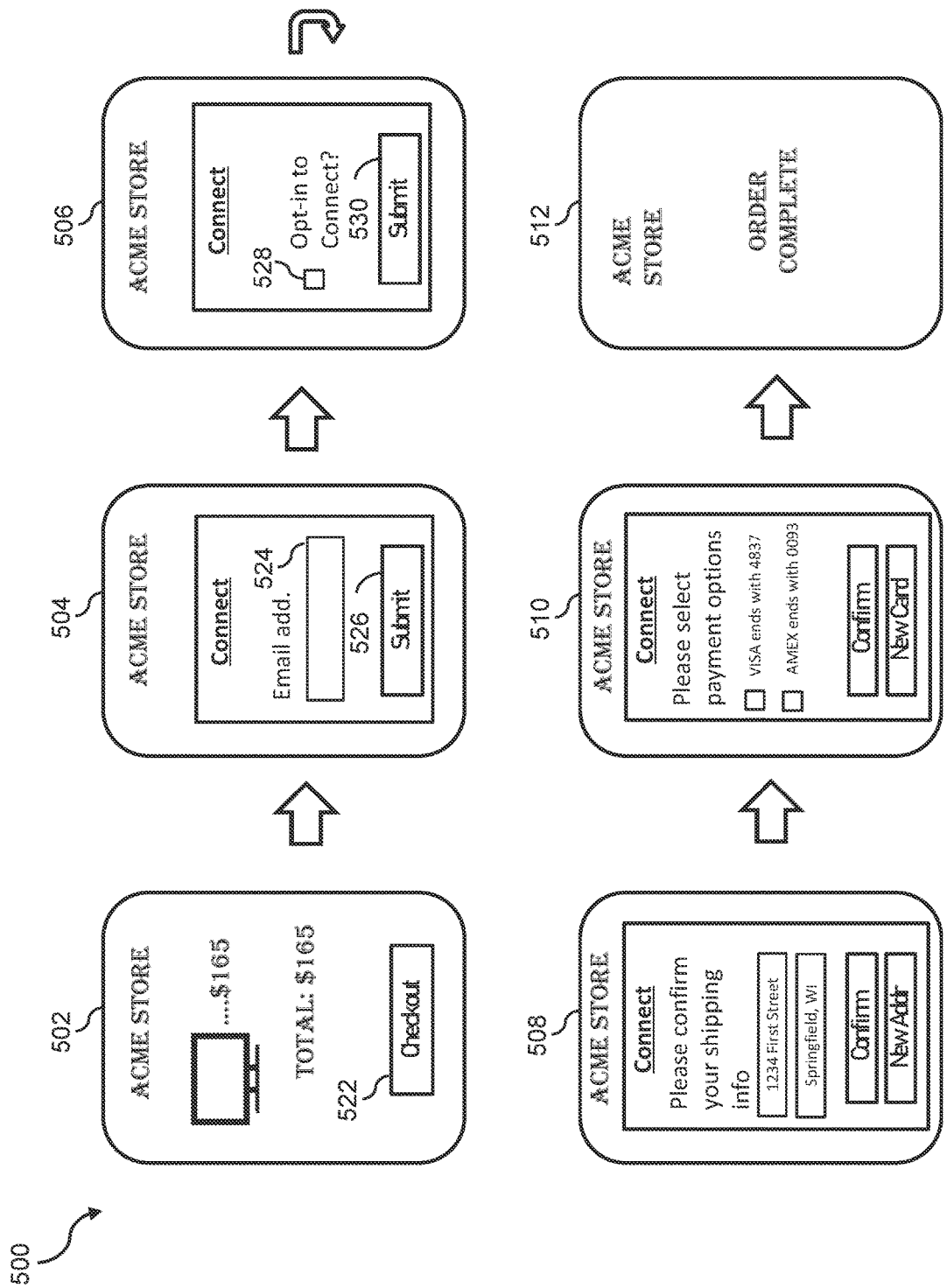
FIG. 5 illustrates another example user interface flow for generating a user profile for a user according to an embodiment of the present disclosure.

FIG. 5 illustrates a progression 500 of interfaces 502-512 provided by the connect system when a user has not opted in to the connect service but has registered an account with a third-party server according to various embodiments of the disclosure. The screen progression 500 begins with an interface 502, during which the user 140 is accessing an online platform (e.g., the merchant client 240). The interfaces 502, 504, and 506 are similar to the interfaces 302, 304, and 306 of the progression 300 of interfaces. Specifically, the merchant client 240 in this example is associated with a merchant that sells electronics, and the user 140 has selected a monitor for purchase from the merchant via the merchant client 240, as shown on the interface 502. The interface 502 also includes a "checkout" selectable element 522 that enables the user to initiate a purchase transaction with the merchant for the selected monitor. In some embodiments, a connect client module (e.g., the connect client module 242) may be integrated within the merchant client 240. As such, the connect client module 242 may detect that the user 140 is accessing the online platform. Upon detecting that the user 140 is accessing the online platform, the connect client module 242 may provide the interface 504 for prompting the user for an identifier via a text input field 524. After providing the identifier in the text input field 524, the user 140 may submit the identifier to the connect client module 242 by selecting a "submit" selectable element 526 via the interface 504. Upon receiving the identifier from the user, the connect client module 242 may transmit the identifier to the connect module 132. The connect module 132 may determine whether a user profile exists for the user 140 in the profile database 208.

In this example, the connect module 132 determines that no user profile exists for the user 140, and thus, instructs the connect client module 132 to prompt the user 140 for an indication of whether the user 140 wants to opt in to the connect service of the connect module 132, as shown in the interface 506. The user 140 may indicate the intent to opt in to the connect service by checking the selectable box 528 and selecting the "submit" selectable element 530 via the interface 506.

However, unlike the progression 300 of interfaces, before prompting the user 140 for the user data on the user interface, the connect module 132 of some embodiments may first determine whether the user has registered an account with a third-party entity server, such as the merchant server 120, the server 180, the server 190, or other servers. In some embodiments, the connect module 132 may instruct the connect client module 242 to communicate with the online platform (e.g., the merchant client 240) that is currently accessed by the user 140, and inquire about an account status of the user 140. If the merchant client 240 indicates that the user 140 has registered an account with the merchant server 120, the connect client module 242 may request access to the user data of the account of the user 140 that is stored on the merchant server 120.

In some embodiments, the connect module 132 may also communicate with other servers, such as the server 180 and/or the server 190, and inquire an account status of the user 140 with these other servers. As discussed herein, the servers 180 and 190 may be associated with another merchant, a payment service provider, or other service provider that may store user data associated with the user 140. As such, if any of the other servers stores user data associated with the user 140, the connect module 132 may retrieve the user data from the respective server(s).

If multiple versions of the user data have been obtained from the servers (e.g., the merchant server 120, the server 180, the server 190, etc.), the connect module 132 may store the multiple versions of the user data in a user profile generated for the user 140. In some embodiments, the connect module 132 may associate different versions of the user data with different entities (e.g., different merchants, different service providers, etc.), such that the connect module 132 may dynamically use different versions of the user data to facilitate transactions associated with the user 140 subsequently.

For example, since the user 140 is accessing the merchant client 240 associated with the merchant server 120, the connect module 132 may determine to share the version of the user data associated with the merchant server 120 during this online session. As such, instead of prompting the user 140 for the user data, the connect client module 242 may display the user data retrieved from the merchant server 120, as shown on the interfaces 508 and 510. Specifically, via the interface 508, the connect client module 242 may present the shipping address of the user 140, and enable the user 140 to confirm whether to use the shipping address presented on the interface 508 or enter another shipping address. The interface 510 illustrates a scenario when multiple funding instruments have been retrieved from the merchant server 120 and/or stored in the user profile associated with the user 140. In some embodiments, when the connect module 132 cannot determine which funding instrument has a higher priority for use in the online session, the connect module 132 may instruct the connect client module 242 to present all of the funding instruments on the user interface for the user 140 to select. In this example, two funding instruments including a VISA credit card with an account number that ends with 4857 and an American Express credit card with an account number that ends with 0093 are presented on the interface 510. The interface 510 also enables the user 140 to select either one of the funding instrument for use in the transaction with the merchant client 240, or enter a new funding instrument. After the user has selected (or provided information associated with) a funding instrument, the connect module 132 may generate a payment token based on the funding instrument, and transmit the payment token to the merchant client 240 to complete the transaction. The connect client module 242 may also terminate the user interface, which enables the user 140 to interact directly with the merchant client 240. The merchant client 240 may then provide the interface 512 to indicate to the user 140 that the purchase transaction has been processed.

Figure 6:
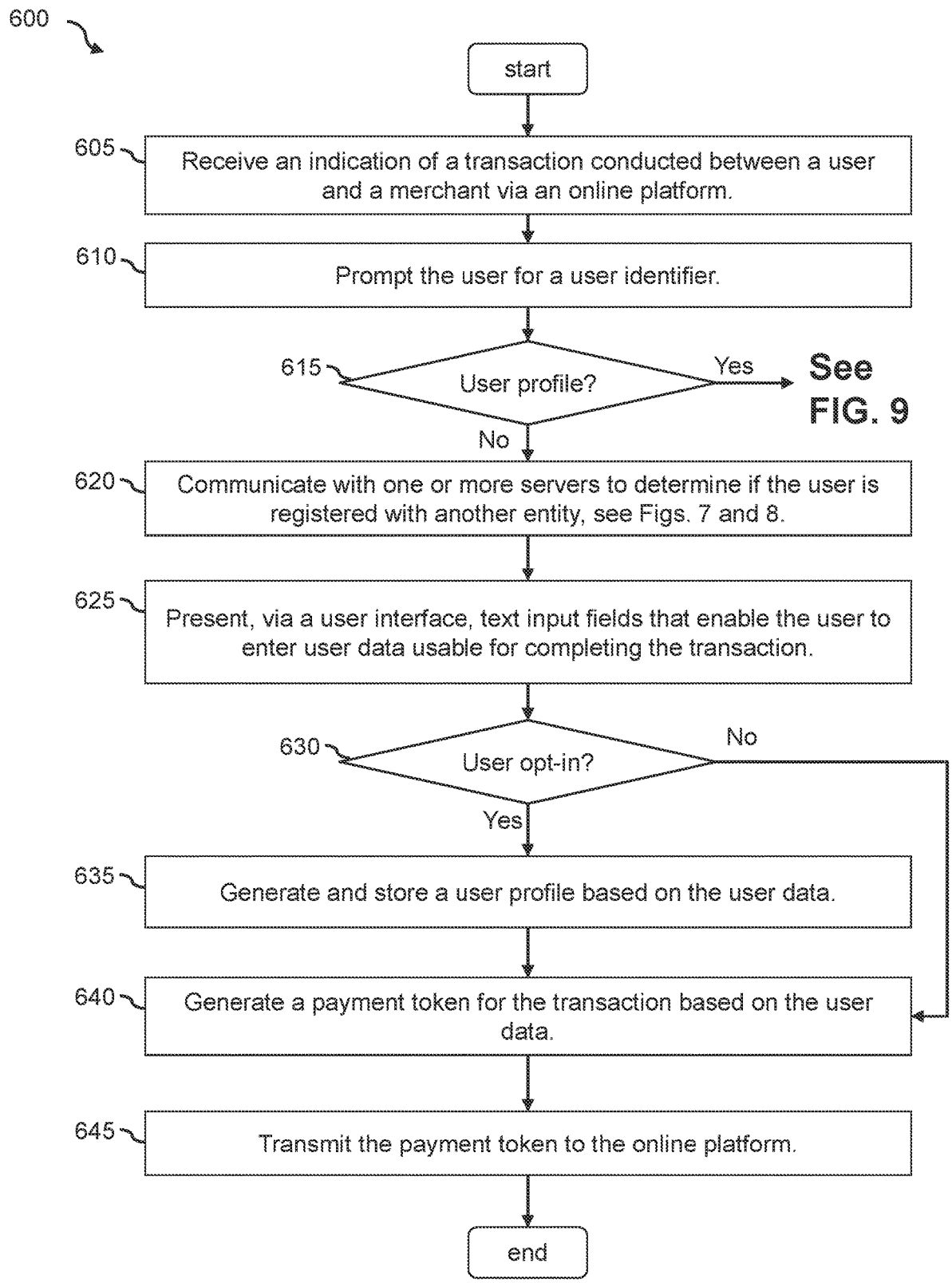
FIG. 6 is a flowchart showing a process of generating a user profile based on user data obtained from a user according to an embodiment of the present disclosure.

FIG. 6 illustrates a process 600 for managing user data to process a transaction between a user and an online platform according to various embodiments of the disclosure. In some embodiments, at least a portion of the process 600 may be performed by the connect module 132 and/or the connect client module 242. The process 600 begins by receiving (at step 605) an indication of a transaction conducted between a user and a merchant via an online platform and prompting (at step 610) the user for a user identifier. For example, the connect client module 242 that is integrated within the merchant client 240 (which may be a merchant website or a merchant application) may detect if a user (e.g., the user 140) accesses the merchant client 240 in an online session. The connect client module 242 may monitor the interactions between the user 140 and the merchant client 240 and may detect that a transaction (e.g., a payment transaction, an onboarding transaction, a purchase transaction, etc.) is conducted between the user 140 and the merchant client 240. During the online session, the connect client module 242 may generate a user interface (that may be separate from the user interface provided by the merchant client, and in some embodiments, may be within a frame of the user interface provided by the merchant client) for directly interacting with the user 140. The connect client module 242 may prompt, via the user interface, the user 140 for an identifier.

The process 600 then determines (at step 615) whether a user profile exists for the user 140 based on the identifier. If a user profile exists for the user 140, a different process (e.g., a process 900) may be executed, which will be further explained below by reference to FIG. 9. On the other hand, if no user profile exists for the user 140, the process 600 communicates (at step 620) with one or more servers to determine if the user has registered with another entity, which will be discussed in more detail below by reference to FIGS. 7 and 8.

The process 600 then presents (at step 625), via a user interface, text input fields that enable the user to enter user data usable for completing the transaction. For example, the connect client module 242 may present, via the user interface generated for the online session, text input fields that enable the user 140 to provide user data, such as a shipping address, a billing address, funding instrument data, etc. for completing the transaction. In some embodiments, the connect client module 242 may also prompt, via the user interface, the user 140 for an indication of whether the user desires to opt in to the connect service.

The process 600 determines (at step 630) if the user has opted-in to the connect service. If it is determined that the user does not desire to opt in to the connect service, the connect client module 242 may terminate the user interface provided on the merchant client 240, such that the user 140 may continue to interact with the merchant client 240 directly to complete the transaction. On the other hand, if it is determined that the user desires to opt in to the connect service, the process generates and stores (at step 635) a user profile based on the user data. For example, the connect module 132 may generate a user profile for the user 140, that is linked to the identifier provided by the user 140. Upon receiving the user data from the connect client module 242 via the user interface, the connect module 132 may store the received user data in the user profile, for use in subsequent transactions involving the user 140.

The process 600 then generates (at step 640) a payment token for the transaction based on the user data and transmits (at step 645) the payment token to the online platform. For example, the connect module 132 may generate a payment token using the funding instrument data received from the user 140. The payment token can be interpreted and processed by a payment processing server (e.g., the payment processing server 250) to complete the transaction. The connect module 132 may then transmit the payment token to the merchant client 240 via the connect client module 242. The merchant client 240 and/or the merchant server 120 may then pass the payment token to the payment processing server 250 via a payment network to complete the transaction.

Figure 7:
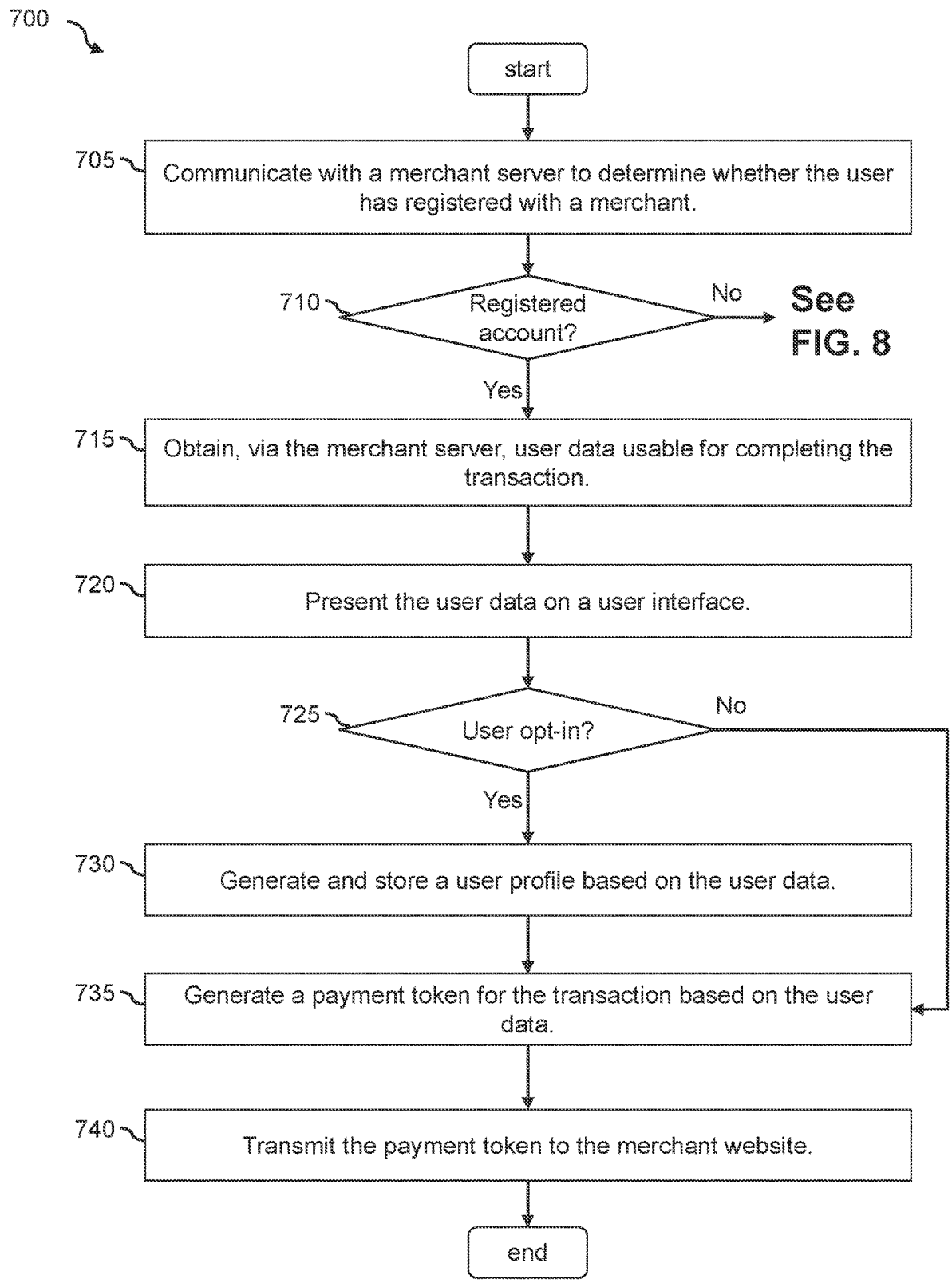
FIG. 7 is a flowchart showing a process of generating a user profile based on user data obtained from a merchant server according to an embodiment of the present disclosure.

FIG. 7 illustrates a process 700 for managing and sharing user data to process a transaction between a user and an online platform when the user has registered an account with the online platform according to various embodiments of the disclosure. Specifically, the process 700 implements the step 620 of the process 600 in FIG. 6. In some embodiments, at least a portion of the process 700 may be performed by the connect module 132 and/or the connect client module 242. The process 700 begins by communicating (at step 705) with a merchant server to determine whether the user has registered with a merchant. For example, the connect client module 242 may communicate with the merchant client 240 via the API of the merchant client 240 to determine whether the user 140 has an account with the merchant based on the identifier provided by the user 140.

The process 700 determines (at step 710) whether the user has registered with merchant. If it is determined that the user has not registered with the merchant, the process 700 may execute a process 800, which will be discussed in more details below by reference to FIG. 8. On the other hand, if it is determined that the user has registered with the merchant, the process 700 obtains (at step 715), via the merchant server, user data usable for completing the transaction and presents (at step 720) the user data on a user interface. For example, the connect client module 242 may obtain the user data (e.g., a shipping address, funding instrument data, etc.) from the merchant server 120 via the merchant client 240, and may present the user data on the user interface generated for the online session. The connect client module 242 may also enable, via the user interface, the user 140 to confirm that the user data presented on the user interface should be used for the transaction or to enter new user data.

The process 700 then determines (at step 725) if the user has indicated a desire to opt in to the connect service, and generates and stores (at step 730) a user profile based on the user data if it is determined that the user has opted in to the connect service. For example, the connect client module 242 may have previously prompted the user 140 for an indication of a desire to opt in to the connect service during the online session. If it is determined that the user 140 has indicated a desire to opt in to the connect service, the connect client module 242 may transmit the user data to the connect module 132 along with an 'opt in' signal, and the connect module 132 may generate a user profile and store the user data retrieved from the merchant server 120 in the user profile.

Irrespective of whether the user has opted in to the connect service, the process 700 generates (at 735) a payment token for the transaction based on the user data and transmits (at 740) the payment token to the merchant website. For example, the connect module 132 may generate a payment token using the user data retrieved from the merchant server 120. The connect module 132 may then transmit the payment token to the merchant client 240 via the connect client module 242. The merchant client 240 and/or the merchant server 120 may then pass the payment token to the payment processing server 250 via a payment network to complete the transaction.

Figure 8:
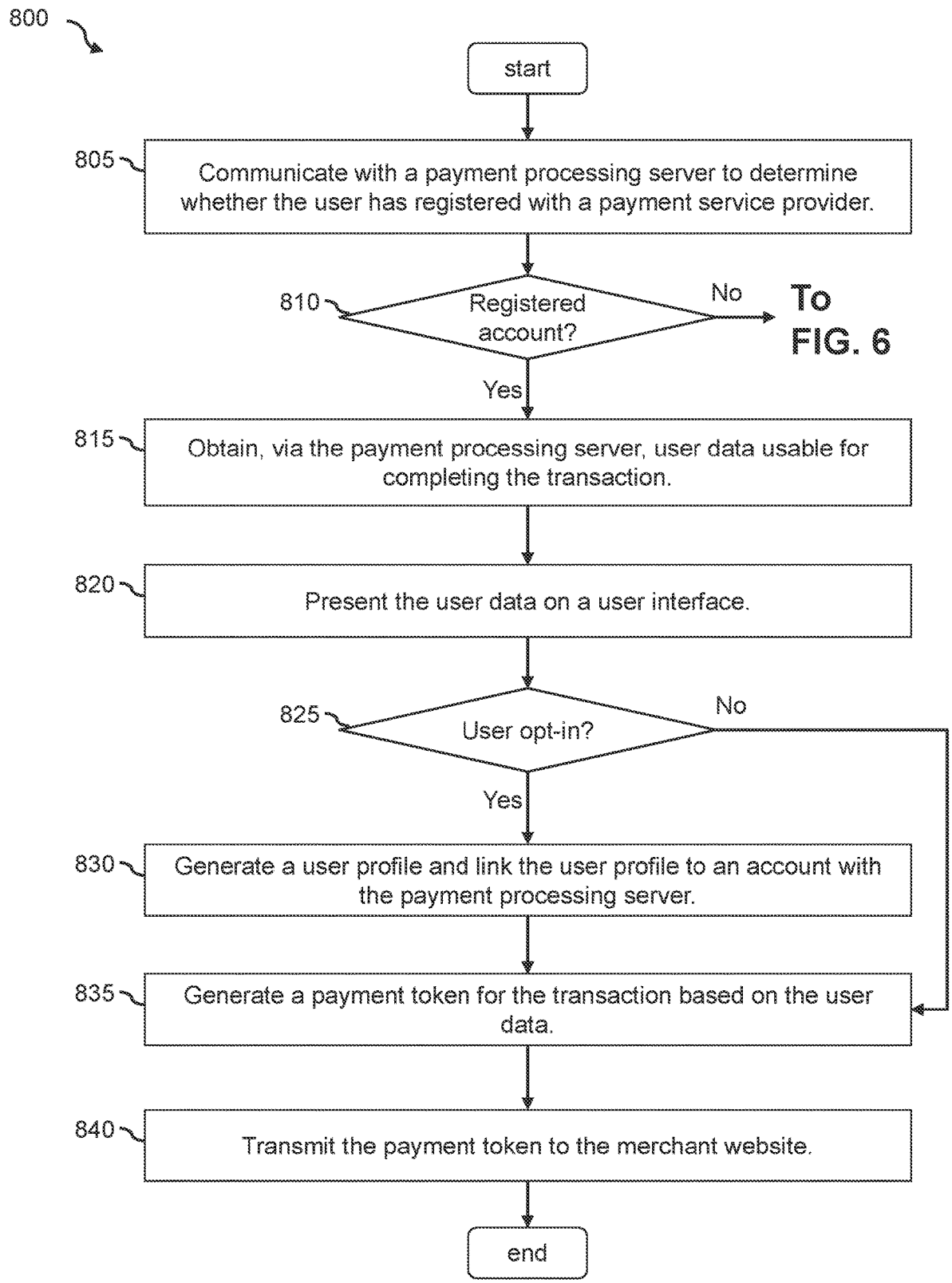
FIG. 8 is a flowchart showing a process of generating a user profile based on user data obtained from a payment processing server according to an embodiment of the present disclosure.

FIG. 8 illustrates a process 800 for managing and sharing user data to process a transaction between a user and an online platform when the user has registered an account with a third-party entity according to various embodiments of the disclosure. Specifically, the process 800 implements the step 620 of the process 600 in FIG. 6, and may be performed in concurrent with the process 700 or after the process 700 determines that the user has not registered an account with the online platform. In some embodiments, at least a portion of the process 800 may be performed by the connect module 132 and/or the connect client module 242. The process 800 begins by communicating (at step 705) with a server to determine whether the user has registered with a third-party entity. For example, the connect module 132 may communicate with a server (e.g., the server 180, server 190, the payment processing server 250, etc.), to determine whether the user 140 has registered an account with any one of the other servers. As discussed herein, at least one of the server 180, the server 190, or the payment processing server 250 may correspond to a payment service provider, and the user 140 may have registered an account with the payment service provider for processing payments involving the user 140.

The process 800 then determines (at step 810) whether the user has registered an account with any one of the payment service providers. If it is determined that the user has not registered an account with any one of the payment service providers, the process 800 may revert back to the step 625 and continues the remaining steps of the process 600. On the other hand, if it is determined that the user has registered an account with a payment service provider, the process 800 obtains (at step 815), via the payment processing server, user data usable for completing the transaction and presents (at step 820) the user data on a user interface. For example, the connect module 132 may obtain the user data (e.g., a shipping address, funding instrument data, etc.) from the server, and may present the user data on the user interface generated for the online session. The connect client module 242 may also enable, via the user interface, the user 140 to confirm that the user data presented on the user interface should be used for the transaction or to enter new user data.

The process 800 then determines (at step 825) if the user has indicated a desire to opt in to the connect service, and generates (at step 830) a user profile and link the user profile to an account with the payment processing server if it is determined that the user has opted in to the connect service. For example, the connect client module 242 may have previously prompted the user 140 for an indication of a desire to opt in to the connect service during the online session. If it is determined that the user 140 has indicated a desire to opt in to the connect service, the connect client module 242 may transmit the user data to the connect module 132 along with an 'opt in' signal, and the connect module 132 may generate a user profile and store the user data retrieved from the merchant server 120 in the user profile. In some embodiments, the payment service provider with which the user 140 has an account may be affiliated with the connect module 132. In such a scenario, instead of storing the user data in the user profile, the connect module 132 may link the user profile to the user account of the user 140 with the payment service provider. The link between the user profile of the user 140 and the user account ensures that the connect module 132 can access any modifications/updates to the user data in the user account with the payment service provider, such that the user data that is used by the connect module 132 in facilitating transactions between the user 140 and the online platforms is current.

Irrespective of whether the user has opted in to the connect service, the process 800 generates (at 835) a payment token for the transaction based on the user data and transmits (at 840) the payment token to the merchant website. For example, the connect module 132 may generate a payment token using the user data retrieved from the merchant server 120. The connect module 132 may then transmit the payment token to the merchant client 240 via the connect client module 242. The merchant client 240 and/or the merchant server 120 may then pass the payment token to the payment processing server 250 via a payment network to complete the transaction.

Figure 9:
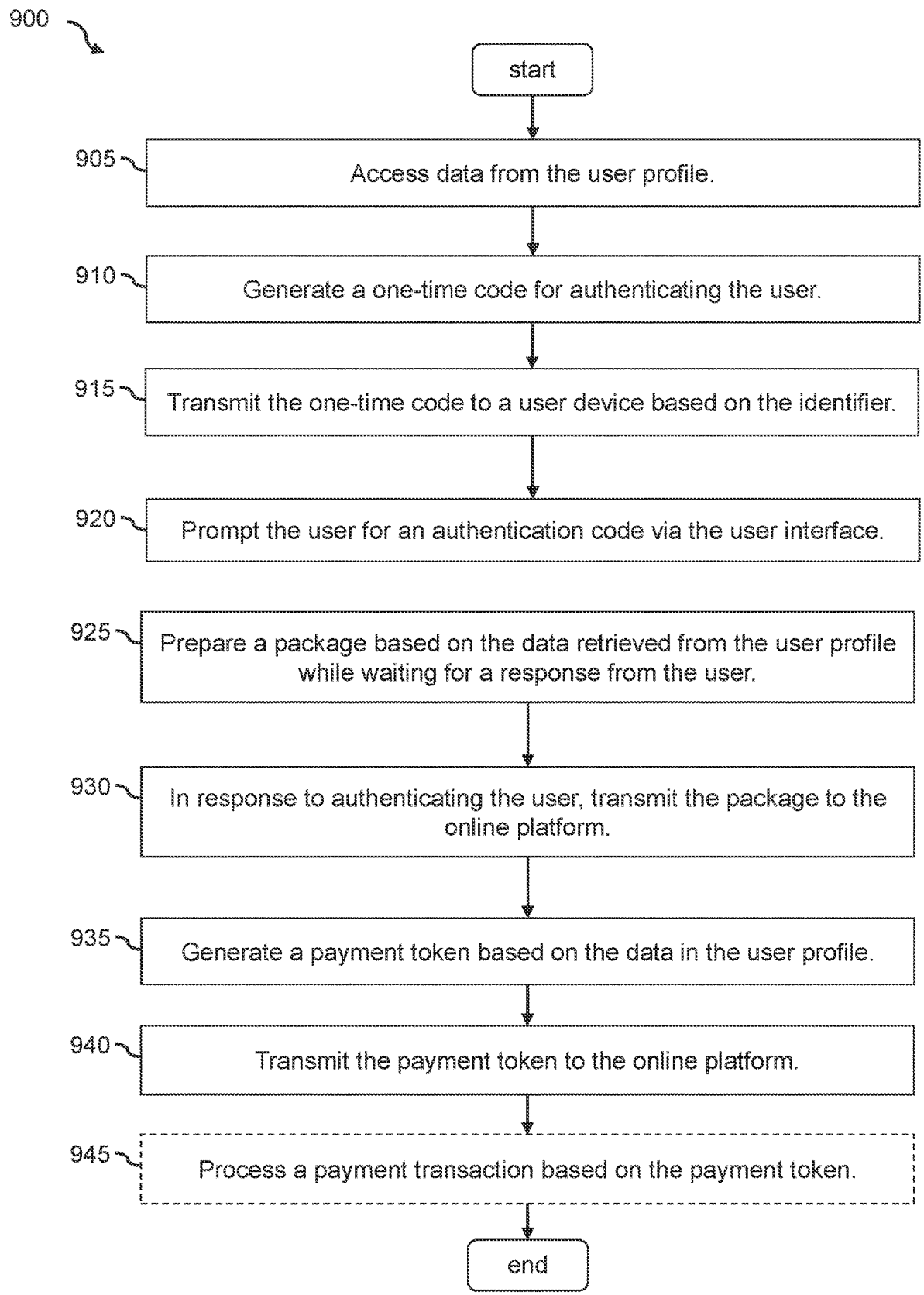
FIG. 9 is a flowchart showing a process of sharing user data from a user profile associated with a user with an online platform according to an embodiment of the present disclosure.

FIG. 9 illustrates a process 900 for managing and sharing user data to process a transaction between a user and an online platform according to various embodiments of the disclosure. Specifically, the process 900 is executed when it is determined that the user is associated with an existing user profile in the step 615 of the process 600. For example, the user 140 may have opted in to the connect service during a previous interaction with the connect client module 242. By executing the process 600, the process 700, or the process 800, the connect module 132 may have generated a user profile for the user 140 after the user 140 has indicated a desire to opt in to the connect service. The process 900 may be executed when the user 140 subsequently access an online platform.

In some embodiments, at least a portion of the process 900 may be performed by the connect module 132 and/or the connect client module 242. The process 900 begins by accessing (at step 905) data from the user profile. For example, after determining that the user profile has been generated for the user 140, the connect module 132 may access the user data in the user profile associated with the user 140 and linked to the identifier provided by the user 140.

The connect module 132 may also initiate an authentication process for authenticating the user 140 for the transaction. Specifically, the process 900 generates (at step 910) a one-time code for authenticating the user, transmits (at step 915) the one-time code to a user device based on the identifier, and prompts (at step 920) the user for an authentication code via the user interface. For example, the connect module 132 may generate a one-time code for authenticating the user 140. Based on the identifier, the connect module 132 may transmit the one-time code to a user device. For example, if the identifier corresponds to a phone number, the one-time code may be transmitted to a user device via a short message service (SMS), etc. If the identifier corresponds to an e-mail address, the one-time code may be transmitted to an inbox of an e-mail account via an e-mail protocol. The connect client module 242 may prompt, via a user interface, the user 140 for an authentication code.

In order to enhance the efficiency of sharing the user data with the online platform, the process 900 prepares (at step 925) a package based on the data retrieved from the user profile while waiting for a response for the user, and in response to authenticating the user, transmits (at step 930) the package to the online platform. For example, the connect module 132 may prepare a package based on the user data retrieved from the user profile associated with the user 140. The connect module 132 may suspend the transmission of the package to the connect client module 242 while waiting for the user to be authenticated. After the user 140 has provided the authentication code via the user interface, and the connect module 132 has verified the authentication code, the connect module 132 may transmit the package to the connect client module 242. The connect client module 242 may extract the user data from the package and present the user data to the user 140 via the user interface. The user interface may also enable the user 140 to confirm the use of the user data for the transaction or to provide new user data for the transaction.

The process 900 then generates (at step 935) a payment token based on the data in the user profile and transmits (at step 940) the payment token to the online platform. For example, the connect module 132 may generate a payment token using the funding instrument data obtained from the user profile associated with the user 140. The payment token can be interpreted and processed by a payment processing server (e.g., the payment processing server 250) to complete the transaction. The connect module 132 may then transmit the payment token to the merchant client 240 via the connect client module 242. The merchant client 240 and/or the merchant server 120 may then pass the payment token to the payment processing server 250 via a payment network to complete the transaction.

In some embodiments, the merchant associated with the merchant client 240 may use a payment service provider that is associated with the connect module 132. In such a scenario, the process 900 will process (at step 945) the payment transaction based on the payment token. For example, the payment processing server 250 may extract the funding instrument information from the payment token, and may transmit the funding instrument information to the issuer bank and the acquirer bank via the payment network to complete the transaction.

FIG. 10 is a block diagram of a computer system 1000 suitable for implementing one or more embodiments of the present disclosure, including the service provider server 130, the merchant server 120, the user device 110, the server 180, the server 190, and the payment processing server 250. In various implementations, the user device 110 may include a mobile cellular phone, personal computer (PC), laptop, wearable computing device, etc. adapted for wireless communication, and each of the service provider server 130, the merchant server 120, the server 180, the server 190, and the payment processing server 250 may include a network computing device, such as a server. Thus, it should be appreciated that the devices 110, 120, 130, 180, 190, and 250 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via a network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the user data management and sharing functionalities described herein, for example, according to the processes 600, 700, 800, and 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system for dynamically managing and sharing user data associated with different users with a plurality of online platforms, the system comprising:
    a non-transitory memory; and
    one or more hardware processors coupled with the non-transitory memory and configured to read instructions from the non-transitory memory to cause the one or more hardware processors to perform operations comprising:
        receiving, from a merchant server, an indication of a user accessing a first merchant website associated with a first merchant and displayed on a device;
        initiating an authentication process for authenticating the user via a first user interface associated with the first merchant website based on a user identifier obtained from the user;
        accessing, from a profile database, a user profile corresponding to the user based on the user identifier;
        in response to authenticating the user, transmitting first data from the user profile to the device, wherein the first data was obtained during a previous user interaction of the user with a second user interface associated with an entity different from the first merchant, and wherein the first data is dynamically used for a transaction between the user and the first merchant website;
        generating a payment token using the first data associated with the user profile; and
        in response to receiving the payment token from the merchant server, processing a payment associated with the transaction based on the payment token.

2. The system of claim 1, wherein the transmitting enables a module executed on the device to populate a set of text input fields corresponding to transaction information on the first merchant website using the first data from the user profile.

3. The system of claim 1, wherein the operations further comprise:
    transmitting the payment token to the device.

4. The system of claim 1, wherein the operations further comprise:
    encoding the first data into the payment token.

5. The system of claim 1, wherein the first data was obtained during a second transaction conducted between the user and a second merchant website associated with a second merchant.

6. The system of claim 1, wherein the first data is associated with a user account of the user with a second merchant website associated with a second merchant.

7. The system of claim 1, wherein the first data is associated with a user account of the user with a payment service provider.

8. A method for dynamically managing and sharing user data associated with different users with a plurality of online platforms, the method comprising:
    receiving, from a server, an indication of a user accessing a first online platform associated with a first entity and displayed on a device;
    determining, by the server, that a user profile associated with the user exists in a profile database based on an identifier obtained from the user via a first user interface associated with the first online platform;
    generating, by the server, a communication package based on a portion of data associated with the user profile, wherein the portion of the data associated with the user profile was obtained during a previous user interaction of the user with a second user interface associated with a second entity different from the first entity, and wherein the portion of the data is dynamically used for a transaction between the user and the first entity;

in response to authenticating the user, transmitting the communication package to the device;

generating, by the server, a session token using the portion of the data associated with the user profile; and in response to receiving the session token from the first online platform, processing, by the server, a payment associated with the transaction based on the session token.

9. The method of claim 8, wherein the data associated with the user profile was obtained during a plurality of user interactions of the user with the plurality of online platforms, and wherein the method further comprises:

selecting, from the data of the user profile, the portion of the data for transmitting to the device based on at least one of an identity of the first entity, a device type of the device, a transaction type, or a location of the user.

10. The method of claim 9, wherein the first-portion of the data is selected using a machine learning model configured to predict a preferred portion of data for a given transaction.

11. The method of claim 8, wherein the communication package is generated prior to authenticating the user, wherein the method further comprises:

suspending a transmission of the communication package to the device while the user is being authenticated.

12. The method of claim 8, wherein the indication is associated with a token request, and wherein the method further comprises:

transmitting the session token to the device.

13. The method of claim 8, wherein prior to the generating, the method further comprises:

encoding the portion of the data associated with the user profile into the session token.

14. The method of claim 8, further comprising:

prompting, via the first user interface, the user for the identifier; and querying the profile database based on the identifier.

15. A non-transitory machine-readable medium having stored thereon machine-readable instructions executable to cause a machine to perform operations comprising:

in response to detecting a user interaction between a user of a device and a first online platform, prompting, via a first user interface associated with the first online platform, the user for a user identifier;

querying a profile database based on the user identifier;

in response to determining that a user profile associated with the user exists in the profile database based on the querying, initiating an authentication process for authenticating the user via the first user interface;

prior to determining that the user is authenticated based on the authentication process, generating a communication package for transmitting to the device based on a portion of data associated with the user profile, wherein the portion of the data is dynamically used for a transaction between the user and the first online platform;

in response to determining that the user is authenticated based on the authentication process, transmitting the communication package to the device;

generating a payment token using the portion of the data associated with the user profile; and in response to receiving the payment token from the first online platform, processing a payment associated with the transaction based on the payment token.

16. The non-transitory machine-readable medium of claim 15, wherein the portion of the data associated with the user profile was obtained during a previous user interaction of the user with a second user interface associated with a second online platform.

17. The non-transitory machine-readable medium of claim 15, wherein the operations further comprise:

generating a one-time passcode for the authentication process;

identifying a user device based on the user identifier; and transmitting the one-time passcode to the device as a part of the authentication process.

18. The non-transitory machine-readable medium of claim 17, wherein the operations further comprise:

prompting, via the first user interface, the user for an authentication code; and authenticating the user based on matching the one-time passcode with the authentication code received via the first user interface.

19. The non-transitory machine-readable medium of claim 15, wherein the operations further comprise:

transmitting the payment token to the device.

20. The non-transitory machine-readable medium of claim 15, wherein the operations further comprise:

encoding the portion of the data into the payment token.

* * * * *

UNITED STATES PATENT AND TRADEMARK OFFICE
CERTIFICATE OF CORRECTION

PATENT NO. : 12,321,939 B2
APPLICATION NO. : 18/452389
DATED : June 3, 2025
INVENTOR(S) : Rohit Basu et al.

Page 1 of 1

It is certified that error appears in the above-identified patent and that said Letters Patent is hereby corrected as shown below:

In the Claims

Claim 10, Column 33, Line 17, change "wherein the first-portion of the" to --wherein the portion of the--

Signed and Sealed this
Twelfth Day of August, 2025

Coke Morgan Stewart
*Acting Director of the United States Patent and Trademark Office*